(12) United States Patent
Chen et al.

(10) Patent No.: US 9,379,930 B2
(45) Date of Patent: *Jun. 28, 2016

(54) TRANSMITTER DEVICES OF I/Q MISMATCH CALIBRATION, AND METHODS THEREOF

(71) Applicant: MediaTek Inc., Hsin-Chu (TW)

(72) Inventors: Hsin-Hung Chen, Zhubei (TW); Hsiang-Hui Chang, Miaoli (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,477

(22) Filed: Apr. 2, 2015

(65) Prior Publication Data

US 2015/0215150 A1    Jul. 30, 2015

Related U.S. Application Data

(63) Continuation-in-part of application No. 14/479,453, filed on Sep. 8, 2014, which is a continuation of application No. 13/168,226, filed on Jun. 24, 2011, now Pat. No. 8,861,644.

(51) Int. Cl.
*H04L 27/36* (2006.01)
*H04B 17/13* (2015.01)
*H04B 17/14* (2015.01)

(52) U.S. Cl.
CPC .............. *H04L 27/364* (2013.01); *H04B 17/13* (2015.01); *H04B 17/14* (2015.01)

(58) Field of Classification Search
USPC ................................. 375/297, 324, 226, 302
See application file for complete search history.

(56) References Cited

U.S. PATENT DOCUMENTS

| | | | |
|---|---|---|---|
| 7,567,611 | B2 | 7/2009 | Chien |
| 7,672,364 | B2 | 3/2010 | Kang et al. |
| 7,706,475 | B1 | 4/2010 | Kopikare et al. |
| 7,782,928 | B2 | 8/2010 | Kang et al. |
| 7,856,048 | B1 | 12/2010 | Smaini et al. |
| 8,000,382 | B2 | 8/2011 | Inanoglu et al. |
| 8,861,644 | B2 * | 10/2014 | Chen et al. ............ 375/308 |
| 2005/0111575 | A1 * | 5/2005 | Taler et al. ............ 375/297 |
| 2007/0298733 | A1 | 12/2007 | Cole et al. |

(Continued)

FOREIGN PATENT DOCUMENTS

CN           1392691           1/2003
WO      WO 2010/124298        10/2010

*Primary Examiner* — Eva Puente
(74) *Attorney, Agent, or Firm* — McClure, Qualey & Rodack, LLP

(57) ABSTRACT

A transmitter device with I/Q mismatch compensation and a method thereof are provided. The transmitter device includes a transmitter circuit, a loop-back circuit and a baseband circuit. The transmitter circuit is configured to convert a baseband signal into an RF signal based on a specific gain configuration of a plurality of gain configurations. The loop-back circuit is configured to retrieve the RF signal from the transmitter circuit. The baseband circuit is configured to compensate the baseband signal by specific transmitter I/Q mismatch corresponding to the specific gain configuration, wherein a plurality of transmitter IQ mismatches are determined for the plurality of gain configurations by the retrieved RF signal, and the specific transmitter I/Q mismatch among the plurality of transmitter IQ mismatches is determined by the retrieved RF signal, which is converted in response to the specific gain configuration, from the loop-back circuit.

14 Claims, 14 Drawing Sheets

(56) References Cited

U.S. PATENT DOCUMENTS

| | | |
|---|---|---|
| 2008/0037684 A1 | 2/2008 | Lin |
| 2009/0124214 A1* | 5/2009 | Zhang et al. .................... 455/78 |
| 2009/0310711 A1* | 12/2009 | Chiu et al. .................... 375/302 |
| 2010/0195706 A1* | 8/2010 | Yanagisawa et al. ......... 375/226 |

* cited by examiner

TRANSMITTER DEVICES OF I/Q MISMATCH CALIBRATION, AND METHODS THEREOF

CROSS REFERENCE TO RELATED APPLICATIONS

This application is a Continuation-In-Part of U.S. application Ser. No. 14/479,453, filed on Sep. 8, 2014, which is a Continuation of U.S. application Ser. No. 13/168,226, filed on Jun. 24, 2011 (now U.S. Pat. No. 8,861,644, issued on Oct. 14, 2014), and the entireties of which are incorporated by reference herein.

BACKGROUND OF THE INVENTION

1. Field of the Invention

The disclosure relates generally to I/Q mismatch calibration, and, more particularly to devices of I/Q mismatch detection and compensation, and methods thereof.

2. Description of the Related Art

In a conventional wireless communication device such as a mobile phone, a digital baseband circuit provides a data stream of complex, digital baseband data to a transmitter, where the transmitted baseband data are often carried by an orthogonal transmitter signal represented by real components and imaginary components, or, in-phase (I) and quadrature (Q) components. In the transmitter, the real component of the transmitter signal is processed along a real-component circuit path and the imaginary component is processed along an imaginary-component circuit path, the circuit paths being parallel to each other. The digital and analog signal processing along the real-component and the imaginary-component circuit path are all in parallel, and may include multiplexing, filtering, power controlling, up-sampling and so on. The parallel signal processed transmitter signal is modulated to produce an analog radio frequency (RF) signal to be amplified and radiated into the air interface from an antenna, providing a base station of the communication system with communication data exchange.

Ideally, the real and imaginary components are processed along parallel circuit paths in the transmitter, and the circuit elements along one path are identical or matched with corresponding circuit elements along the other path. However, the corresponding circuit elements along the real and imaginary circuit paths may have differences from each other due to manufacturing process variations or geometrical layout differences, resulting in amplitude differences ("IQ gain mismatch") and phase differences ("IQ phase mismatch") between the real and imaginary components that are processed along the parallel paths and causing degraded signal quality.

Thus devices capable of I/Q mismatch calibration and methods thereof are needed to optimize transmitted signal quality.

BRIEF SUMMARY OF THE INVENTION

An embodiment of a transmitter device with I/Q mismatch compensation is disclosed, including a transmitter circuit, a loop-back circuit and a baseband circuit. The transmitter circuit is configured to convert a baseband signal into an RF signal based on a specific gain configuration of a plurality of gain configurations. The loop-back circuit is configured to retrieve the RF signal from the transmitter circuit. The baseband circuit is configured to compensate the baseband signal by a specific transmitter I/Q mismatch parameter corresponding to the specific gain configuration, wherein a plurality of transmitter I/Q mismatch parameters are determined for the plurality of gain configurations by the RF signal retrieved from the loop-back circuit.

Another method compensating for I/Q mismatch and adopted by a transmitter device is provided, including: converting a baseband signal into an RF signal based on a specific gain configuration of a plurality of gain configurations; and compensating the baseband signal by a specific transmitter I/Q mismatch parameter corresponding to the specific gain configuration, wherein a plurality of transmitter I/Q mismatch parameters are determined for the plurality of gain configurations by the RF signal.

Another embodiment of a transmitter device with I/Q mismatch compensation is disclosed, including a transmitter circuit, a loop-back circuit and a baseband circuit. The transmitter circuit is configured to convert a baseband signal into an RF signal based on a plurality of gain configurations. The loop-back circuit is configured to retrieve the RF signal from the transmitter circuit. The baseband circuit is configured to determine a plurality of transmitter I/Q mismatch parameters for the plurality of gain configurations, respectively.

BRIEF DESCRIPTION OF THE DRAWINGS

The invention will become fully understood by referring to the following detailed description with reference to the accompanying drawings, wherein.

DETAILED DESCRIPTION OF THE INVENTION

Figure 1:
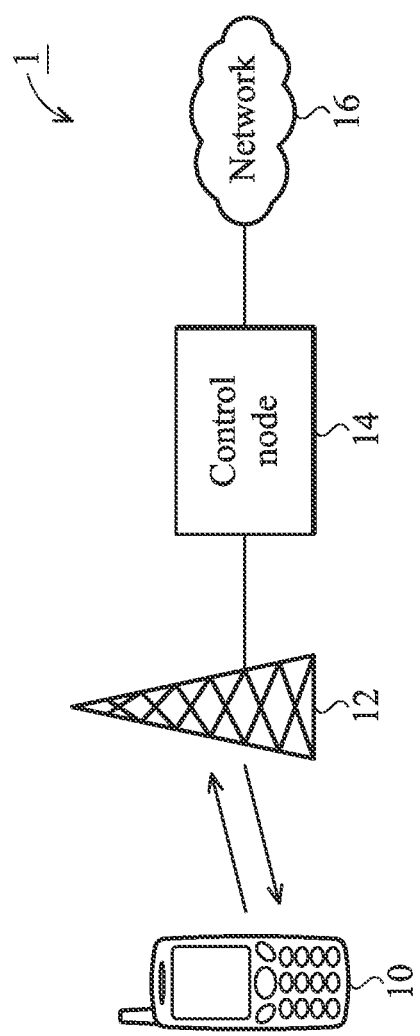
FIG. 1 is a block diagram of an exemplary wireless communication system.

FIG. 1 is a block diagram of an exemplary wireless communication system 1, comprising a communication device 10, a base station 12, a control node 14, and a service network 16. The communication device 10 is wirelessly coupled to the base station 12, which is further coupled to the control node 14 and the service network 16.

The wireless communications between the communication device 10 and the service network 16 may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology and others.

The wireless communication system 1 may use a frequency division duplexing (FDD) technique or a time division duplexing (TDD) technique. In the FDD system, the communication device 10 and the base station 12 communicates through uplink and downlink communication at different frequencies. In the TDD system, the communication device 10 and the base station 12 communicates through uplink and downlink communication at different time, typically deploys asymmetrical uplink and downlink data rates. The communication device 10 may be a hand-held cellular phone, a laptop computer equipped with a wireless adapter, or any other device. The communication device 10 comprises a transceiver module (not shown) for performing the functionality of wireless transmitting and receiving to and from the base station 12. The transceiver module may comprise a baseband unit (not shown) and an analog unit (not shown). The baseband unit may comprise hardware to perform baseband signal processing including digital signal processing, coding, decoding and so on. The analog unit may comprise hardware to perform analog to digital conversion (ADC), digital to analog conversion (DAC), gain adjusting, modulation, demodulation and so on. The base station 12 includes transceivers, antenna interface equipment, and power supplies. The service network 16 is a radio access network, such as a GSM network, a UMTS network, and so on. The service network 16 provides wireless communication services to the communication device 10. The uplink and downlink communication between the communication device 10 and the base station 12 employs orthogonal RF signals comprising in-phase (I) and quadrature (Q) components.

Figure 2:
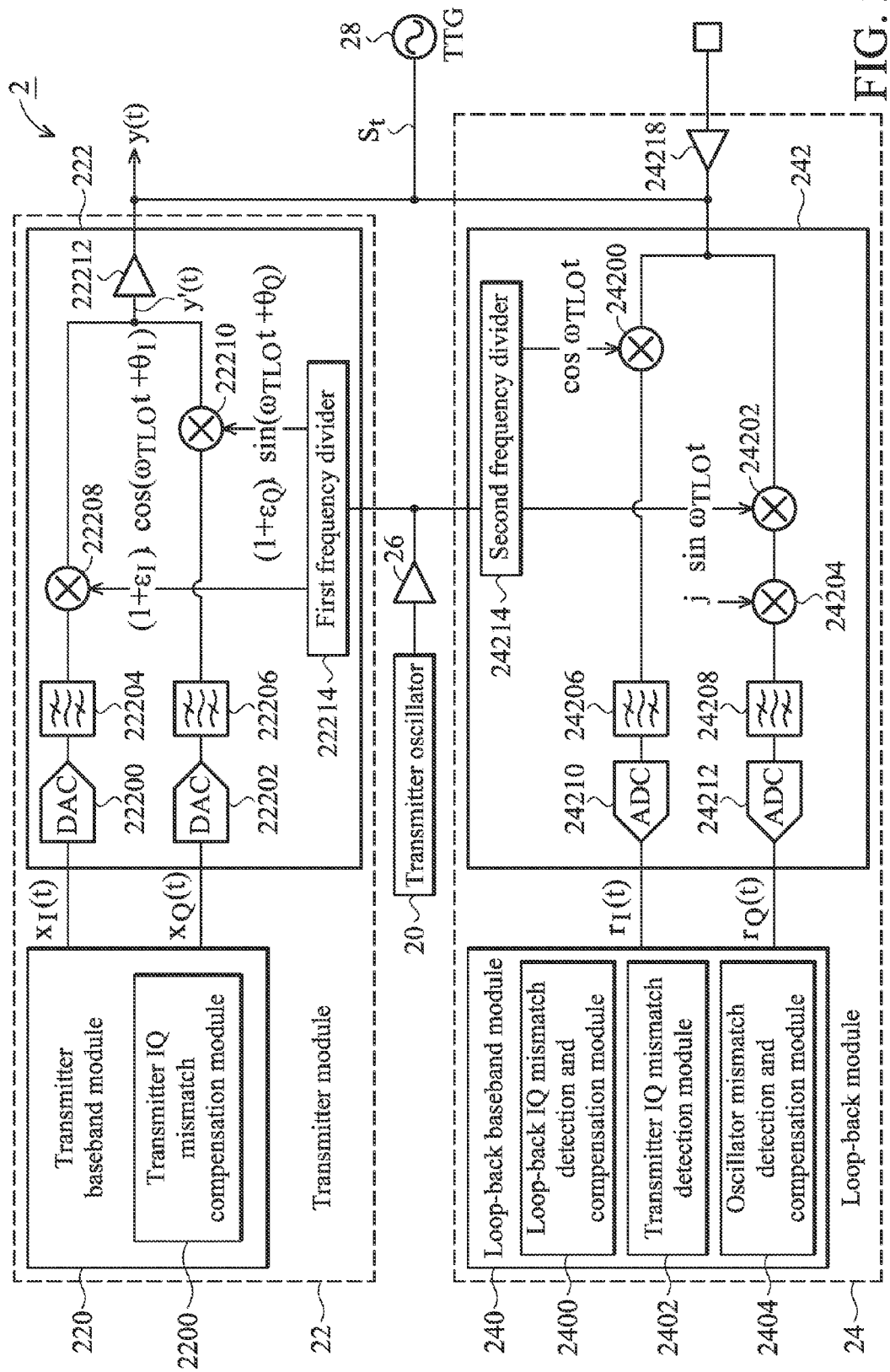
FIG. 2 is a block diagram of an exemplary transceiver circuit in accordance with the present invention.

FIG. 2 is a block diagram of an exemplary transmitter device 2 in accordance with one embodiment of the present invention, incorporated in the communication device 10 in FIG. 1. The transmitter device 2 is utilized in either a FDD or TDD system. The transmitter device 2 capable of detecting and compensating I/Q mismatch comprises a transmitter oscillator 20, a transmitter module 22, a loop-back module 24, an oscillator buffer 26, and a test tone generator 28. The transmitter oscillator 20 is coupled to the oscillator buffer 26, subsequently coupled to the transmitter module 22 and the loop-back module 24. The transmitter module 22 is coupled to the loop-back module 24. The test tone generator 28 is coupled and feeds test tone signals to the loop-back module 24.

The transmitter module 22 comprises a transmitter baseband module 220 and a transmitter analog module 222. The transmitter baseband module 220 comprises a transmitter I/Q mismatch compensation module 2200. The transmitter analog module 222 comprises digital-to-analog converters (DACs) 22200 and 22202, band pass filters 22204 and 22206, mixers 22208 and 22210, programmable gain amplifier (PGA) 22212, and a first frequency divider 22214. The DAC 22200 and 22202 are coupled to the band pass filters 22204 and 22206 respectively. The band pass filters 22204 and 22206 are coupled to the mixers 22208 and 22210 respectively. The mixers 22208 and 22210 are coupled to the PGA 22212. The first frequency divider 22214 is coupled to the mixers 22208 and 22210 and the transmitter oscillator buffer 26.

The loop-back module 24 comprises a loop-back baseband module 240 and a loop-back analog module 242. The loop-back baseband module 240 comprises a loop-back I/Q mismatch detection and compensation module 2400, a transmitter I/Q mismatch detection module 2402, and an oscillator mismatch detection and compensation module 2404. The loop-back analog module 242 comprises mixers 24200, 24202 and 24204, band pass filters 24206 and 24208, analog-to-digital converters (ADCs) 24210 and 24212, a second frequency divider 24214, and a receiver amplifier 24218. The receiver amplifier 24218 is coupled to the mixers 24200 and 24202. The mixer 24200 is coupled to the band-pass filter 24206, and the ADC 24210. The mixer 24202 is coupled to the band-pass filter 24208, and the ADC 24212. The second frequency divider 24214 is coupled to the mixer 24200 and 24202 to provide in-phase and quadrature oscillator signals respectively.

The signal path along the DAC 22200, the band-pass filter 22204, and the mixer 22208 is referred to as an I-path of the transmitter analog module 222. The I-path receives a transmitter signal $x_I(t)$ to generate an in-phase component of an RF signal. The signal path along the DAC 22202, the band-pass filter 22206, and the mixer 22210 is referred to as a Q-path of the transmitter analog module 222. The Q-path receives a transmitter signal $x_Q(t)$ to generate a quadrature component of the RF signal. The transmitter signals $x_I(t)$ and $x_Q(t)$ are the in-phase component and the quadrature component of an transmitter signal transmitted from the transmitter base band module 220. The I-path and Q-path of the transmitter analog module 222 are both referred to as transmitter paths. Similarly, the signal path along the mixer 24200, the band-pass filter 24206, and the ADC 24210 is referred to as an I-path of the loop-back analog module 242. The I-path receives an RF signal y(t) to generate an in-phase component of a down-converted RF signal r(t), represented by $r_I(t)$. The signal path along the mixers 24202, 24204, the band-pass filter 24208, and the ADC 24212 is referred to as a Q-path of the loop-back analog module 242. The mixer 24202 down-converts the RF signal y(t) and the mixer 24204 generates a quadrature component of the down-converted RF signal. The Q-path receives the RF signal y(t) to generate the quadrature component of the down-converted RF signal r(t), represented by $r_Q(t)$. Both of the I-path and Q-path of the transmitter module loop-back analog module 242 are referred to as loop-back paths. The transmitter signal comprises uplink data to be transmitted to the base station in a radio access network.

The transmitter oscillator 20 generates and provides an oscillator signal to the transmitter module 22 and the loop-back module 24 via the oscillator buffer 26. The oscillator signal oscillates at an oscillator frequency $\omega_{TLO}$ and is fed to the transmitter module 22 and the loop-back module 24, providing a carrier signal for modulation and demodulation respectively. The oscillator frequency $\omega_{TLO}$ is a radio frequency (RF) that may be 900 MHz, 1900 MHz, or 2100 MHz in WCDMA systems, 900 MHz, 2100 MHz, or 2.6 GHz in LTE systems, or other frequencies depending on the radio access technology (RAT) in use.

The transmitter module 22 converts the transmitter signal x(t) from digital to analog by using the DAC 22200 and the DAC 22202, filters out unwanted signals in the transmitter signal x(t) by using the band-pass filters 22204 and 22206, and up-converts the transmitter signal x(t) with the oscillator signal to generate the RF signal y(t). The transmitter signal x(t) and RF signal y(t) are orthogonal signals comprising an in-phase component and a quadrature component. The in-phase component and the quadrature component of the RF signal y'(t) are combined and transmitted to the PGA 22212, which amplifies the RF signal y'(t) according to an allocated power to generate an outgoing RF signal y(t) to be transmitted via an antenna (not shown).

Before using the loop-back module 24 to detect a transmitter I/Q mismatch parameter and compensate for a transmitter I/Q mismatch in the transmitter path, the loop-back module 24 needs to be calibrated so that no loop-back I/Q mismatch remains therein. The loop-back module 24 receives a test tone signal $S_t$ from the test tone generator 28 and the oscillator signal from the transmitter buffer 26 to determine and reduce effects of I/Q mismatch of a loop-back path in the loop-back module. The loop-back module 24 then down-converts the RF signal y(t) with the oscillator signal to determine the transmitter I/Q mismatch parameter indicating the transmitter I/Q mismatch in the transmitter path. In some embodiments, the transmitter 2 is utilized in a WCDMA communication device, and the loop-back module 24 detects the power level of the amplified RF signal, thereby controlling a PGA gain of the PGA 22212 to produce the amplified RF signal at the allocated power level.

The transmitter I/Q mismatch compensation module 2200 then reduces effects of the transmitter I/Q mismatch of the transmitter path to the transmitter signal x(t) according to the transmitter I/Q mismatch parameter before transmitting the I/Q mismatch reduced transmitter signal x(t) to the transmitter analog module 222.

Figure 3:
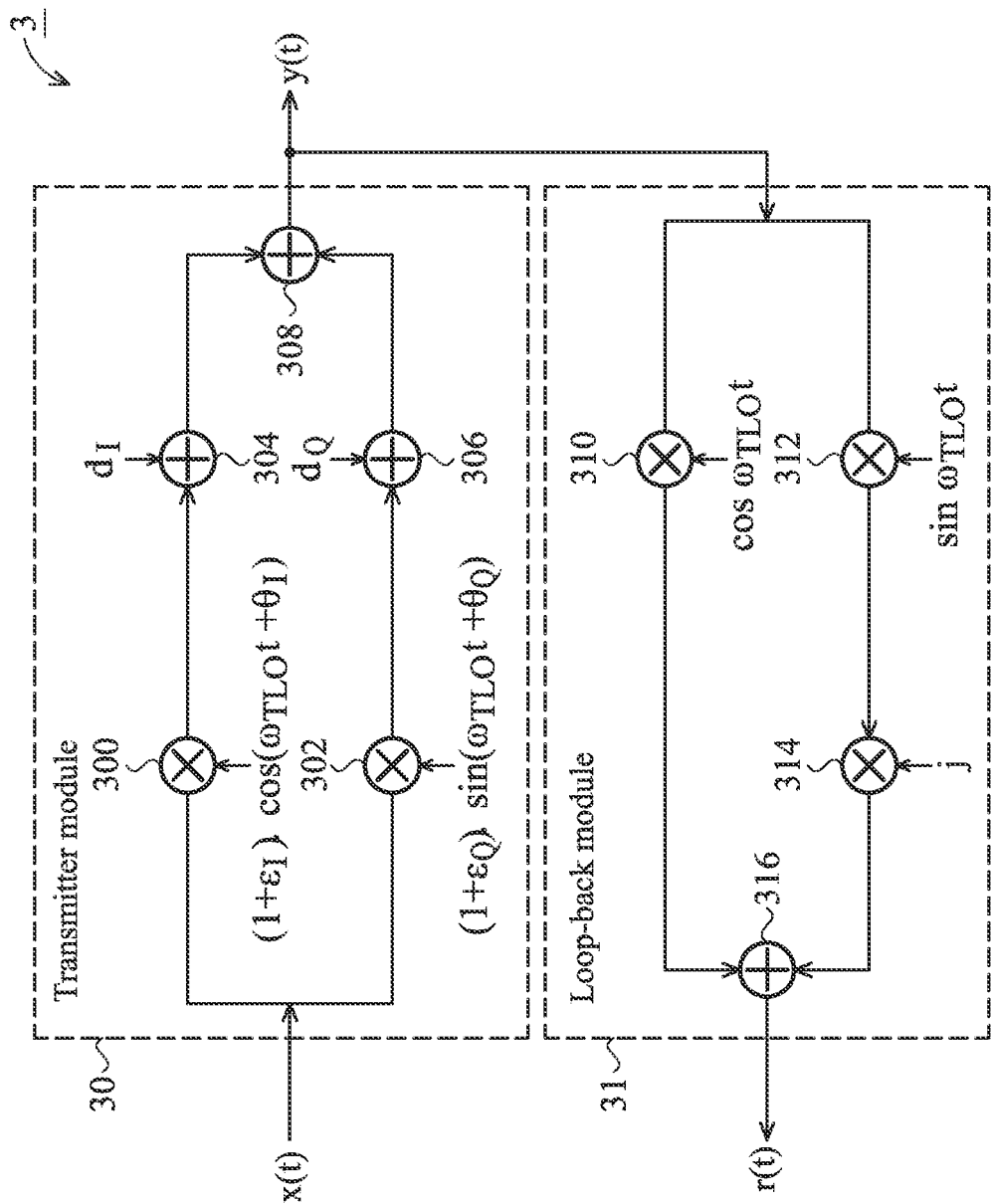
FIG. 3 is a simplified equivalent circuit of the transmitter module 22 and the loop-back module 24 in FIG. 2 after the loop-back I/Q mismatch compensation.

FIG. 3 is a simplified equivalent circuit of the transmitter module 22 and the loop-back module 24 in FIG. 2 after the loop-back I/Q mismatch compensation, illustrating effects of the transmitter I/Q mismatch in the transmitter module 22. The equivalent circuit 3 comprises a transmitter module 30 and a loop-back module 31. The transmitter module 30 comprises mixers 300 and 302, and adders 304, 306, and 308. The mixer 300 is coupled to the adder 304 and the adder 308. The mixer 302 is coupled to the adder 306 and the adder 308. The loop-back module 31 comprises mixers 310, 312, and 314, and an adder 316. The mixer 312 is coupled to the mixer 314, then to the adder 316. The mixer 310 is coupled to the adder 316.

The transmitter signal x(t) is an orthogonal signal comprising an in-phase component I and a quadrature component Q, i.e., x(t)=I+jQ. The signal path along the mixer 300 and the adder 304 is referred to as an I-path of the transmitter module 30. The I-path receives an transmitter signal x(t) to generate an in-phase component of an RF signal. The signal path along the mixer 302 and the adder 306 is referred to as a Q-path of the transmitter module 30. The Q-path receives the transmitter signal x(t) to generate a quadrature component of the RF signal. The I-path and Q-path of the transmitter module 30 are both referred to as transmitter paths.

In absence of the transmitter I/Q mismatch, the RF signal y(t) is shown by:

$$y(t) = I\cos(\omega_{TLO}t) + Q\sin(\omega_{TLO}t) \quad \text{Equation (1)}$$

where $\omega_{TLO}$ is an oscillator frequency of a transmitter oscillator (not shown), and t is time.

In presence of the transmitter presence mismatch, a phase mismatch on the I-path is represented by $\theta_I$ and a phase mismatch on the Q-path is represented by $\theta_Q$, a gain mismatch on the I-path is represented by $(1+\epsilon_I)$ and a gain mismatch on the Q-path is represented by $(1+\epsilon_I)$. The RF signal y(t) is expressed as follows:

$$y(t) = \frac{1}{2}(K_1 \cdot x(t) + K_2 * \cdot x*(t))e^{j\omega_{TLO}t} \quad \text{Equation (2)}$$

where $K_1 = \frac{1}{2}(1+\varepsilon_I)e^{j\theta_I} + \frac{1}{2}(1+\varepsilon_Q)e^{-j\theta_Q}$, and $K_2 = \frac{1}{2}(1+\varepsilon_I)e^{-j\theta_I} - \frac{1}{2}(1+\varepsilon_Q)e^{j\theta_Q}$, After the loop-back I/Q mismatch is compensated, the phase and gain I/Q mismatch is absent at the loop-back module 31. The mixer 310 down-converts the RF signal y(t) with an in-phase component (cos $\omega_{TLO}$ t) of an oscillator signal to generate an in-phase component of the down-converted RF signal r(t). The mixer 312 down-converts the RF signal y(t) with a quadrature component (sin $\omega_{TLO}$ t) of an oscillator to generate a quadrature component of the down-converted RF signal r(t). The signal path along the mixer 310 is referred to as an I-path of the loop-back module 31. The signal path along the mixer 312 and the adder 314 is referred to as a Q-path of the loop-back module 31. The I-path and Q-path of the loop-back module 31 are referred to as loop-back paths.

The in-phase and quadrature components of the down-converted RF signal are combined at the adder 316. The down-converted RF signal r(t) is expressed as follows:

$$r(t) = \frac{1}{2}(K_1 \cdot x(t) + K_2 * \cdot x*) \quad \text{Equation (3)}$$

$$= \begin{bmatrix} 1 & j \end{bmatrix} \begin{bmatrix} r_I \\ r_Q \end{bmatrix}$$

$$= \begin{bmatrix} 1 & j \end{bmatrix} \begin{bmatrix} (1+\varepsilon_I)\cos\theta_I & -(1+\varepsilon)\sin\theta_Q \\ (1+\varepsilon_I)\sin\theta_I & (1+\varepsilon_Q)\cos\theta_Q \end{bmatrix} \begin{bmatrix} I \\ Q \end{bmatrix}$$

The down-converted RF signal r(t) is transmitted to the loop-back baseband module 240 in FIG. 2 to determine the transmitter I/Q mismatch parameter.

Referring to FIG. 2, the transceiver circuit 2 is capable of reducing effects between the in-phase and quadrature components of an orthogonal signal in the transmitter module 22, or a transmitter phase or gain IQ mismatch. The transceiver 2 detects the transmitter I/Q mismatch then reduces or removes the transmitter I/Q mismatch with reference to the transmitter I/Q mismatch parameter. The transceiver 2 detects the transmitter I/Q mismatch by determining an I-path I/Q mismatch on the I-path of the transmitter module 22 with reference to a quadrature component being set to 0 on the Q-path of the transmitter module 22 and a Q-path I/Q mismatch on the Q-path of the transmitter module 22 with reference to an in-phase component being set to 0 on the I-path of the transmitter module 22, and then determines the transmitter I/Q mismatch between the I-phase and Q-path according to the I-path I/Q mismatch and Q-path I/Q mismatch.

After the loop-back I/Q mismatch at the loop-back module 24 is compensated, the transceiver 2 may detect and compensate for the transmitter I/Q mismatch using the loop-back path. The transmitter baseband module 220 sets one of an in-phase component and a quadrature component of the transmitter signal to a zero signal to derive a first mismatch parameter of the transmitter I/Q mismatch parameter, and sets the other one of the in-phase component and the quadrature component of the transmitter signal to a zero signal to derive a second mismatch parameter of the transmitter I/Q mismatch parameter. In one embodiment, the transmitter baseband module 220 sets the in-phase component $x_I(t)$ of the transmitter signal to a first non-zero signal I' and the quadrature component $x_Q(t)$ of the transmitter signal to a zero signal to determine an I-path mismatch parameter (first mismatch parameter), and sets the in-phase component $x_I(t)$ of the transmitter signal to a zero signal and the quadrature component $x_Q(t)$ of the transmitter signal to a second non-zero signal Q' to determine a Q-path mismatch parameter (second mismatch parameter). The transmitter I/Q mismatch detection module 2402 then determines the transmitter I/Q mismatch parameter based on the I-path mismatch parameter and the Q-path mismatch parameter so that the transmitter I/Q mismatch compensation module 2200 can use the transmitter I/Q mismatch parameter to reduce the effects of the transmitter IQ mismatch. The first non-zero signal I' can be a direct-current (DC) signal, a sinusoidal signal, or any signal or signal combination that is not 0. For example, the first non-zero signal may be sin(ωt). The second non-zero signal Q' may be a DC signal, a sinusoidal signal, or any signal or signal combination that is not 0. For example, the second non-zero signal may be sin(ωt). The first and second non-zero signals may be identical or different. The identical first and second non-zero signals may simplify the determination of the transmitter I/Q mismatch parameter. Matched in-phase and quadrature components of the orthogonal signal are characterized by no DC difference or DC offset to each other, an orthogonal relationship, or 90 degree out-of-phase, and equal amplitude, or a gain of 1. In embodiments of the present invention, the transmitter I/Q mismatch may be a phase mismatch and/or an amplitude (gain) mismatch.

In one embodiment, the transmitter I/Q mismatch parameter indicates a phase mismatch of the signals on the I-path and the Q-path of the transmitter module 22. The transmitter baseband module 220 sets the in-phase component $x_I(t)$ of the transmitter signal to the first non-zero signal I' and the quadrature component $x_Q(t)$ of the transmitter signal to the zero signal to generate the down-converted RF signal r(t), represented by:

$$r_{I\text{-}Path}(t) = \begin{bmatrix} 1 & j \end{bmatrix} \begin{bmatrix} r_{I\_IPATH} \\ r_{Q\_IPATH} \end{bmatrix}$$
$$= \begin{bmatrix} 1 & j \end{bmatrix} \begin{bmatrix} (1+\varepsilon_I)\cos\theta_I \cdot I' & 0 \\ (1+\varepsilon_I)\sin\theta_I \cdot I' & 0 \end{bmatrix}$$

Equation (4)

The transmitter I/Q mismatch detection module 2402 determines the I-path mismatch parameter $\theta_I$ according to the in-phase component and the quadrature component of the down-converted RF signal r(t), where:

$$\theta_I \approx \tan\theta_I = r_Q(I',0)/r_I(I',0)$$

Equation (5)

The transmitter baseband module 220 sets the in-phase component $x_I(t)$ of the transmitter signal to the zero signal and the quadrature component $x_Q(t)$ of the transmitter signal to the first non-zero signal Q' to generate the down-converted RF signal r(t), represented by:

$$r_{Q\text{-}Path}(t) = \begin{bmatrix} 1 & j \end{bmatrix} \begin{bmatrix} r_{I\_IPATH} \\ r_{Q\_IPATH} \end{bmatrix}$$
$$= \begin{bmatrix} 1 & j \end{bmatrix} \begin{bmatrix} 0 & -(1+\varepsilon_I)\sin\theta_Q \cdot Q' \\ 0 & (1+\varepsilon_I)\cos\theta_Q \cdot Q' \end{bmatrix}$$

Equation (6)

The transmitter I/Q mismatch detection module 2402 determines the Q-path mismatch parameter $\theta_Q$ according to the in-phase component and the quadrature component of the down-converted RF signal r(t) as follows:

$$\theta_Q \approx \tan\theta_Q = r_I(0,Q')/r_Q(0,Q')$$

Equation (7)

The transmitter I/Q mismatch detection module 2402 determines the transmitter I/Q mismatch parameter θ according to the I-path mismatch parameter $\theta_I$ and the Q-path mismatch parameter $\theta_Q$. In one embodiment, the transmitter I/Q mismatch detection module 2402 determines the transmitter I/Q mismatch parameter θ by determining a difference of the I-path mismatch parameter $\theta_I$ and the Q-path mismatch parameter $\theta_Q$, i.e., $\theta = \theta_I - \theta_Q$. The transmitter I/Q mismatch parameter θ may be transmitted and temporarily stored in a register or any memory unit in the transmitter I/Q mismatch compensation module 2200 so that the transmitter baseband module 220 can access the memory unit to obtain the transmitter I/Q mismatch parameter θ and compensate for the transmitter signal x(t) before outputting the compensated transmitter signal x(t) to the transmitter analog module 222. The transmitter I/Q mismatch compensation module 220 then reduces the effects of the I/Q mismatch of the transmitter path in the transmitter module 22 according to a phase compensation matrix of the transmitter I/Q mismatch parameter:

$$M_\theta = \begin{bmatrix} 1 & -\tan\theta \\ -\tan\theta & 1 \end{bmatrix}$$

Equation (8)

The transmitter I/Q mismatch compensation module 220 then reduces effects of I/Q mismatch of a transmitter path in the transmitter module 22 according to the phase compensation matrix of the transmitter I/Q mismatch parameter. The phase compensation matrix $M_\theta$ may be implemented by a circuit depicted in FIG. 5.

In another embodiment, the transmitter I/Q mismatch parameter indicates a gain mismatch between an I-path and a Q-path of the transmitter module 22. The transmitter baseband module 220 sets the in-phase component $x_I(t)$ of the transmitter signal to the first non-zero signal I' and the quadrature component $x_Q(t)$ of the transmitter signal to the zero signal to generate the down-converted RF signal r(t), represented by the Equation (4). The transmitter I/Q mismatch detection module 2402 determines the I-path mismatch parameter $(1+\varepsilon_I)$ according to the in-phase component I' of the transmitter signal, in-phase component $r_I(I', 0)$ and the quadrature component $r_Q(I', 0)$ of the down-converted RF signal, as shown by:

$$1 + \varepsilon_I = \frac{\sqrt{(r_{I\_IPATH}^2 + r_{Q\_IPATH}^2)}}{I'} \qquad \text{Equation (9)}$$

The transmitter baseband module 220 sets the in-phase component $x_I(t)$ of the transmitter signal to the zero signal and the quadrature component $x_Q(t)$ of the transmitter signal to the first non-zero signal Q' to generate the down-converted RF signal r(t), shown as Equation (6). The transmitter I/Q mismatch detection module 2402 determines the Q-path mismatch parameter $(1+\varepsilon_Q)$ according to the quadrature component Q' of the transmitter signal, the in-phase component $r_I(0, Q')$ and the quadrature component $r_Q(0, Q')$ of the down-converted RF signal, as shown by:

$$1 + \varepsilon_Q = \frac{\sqrt{(r_{I\_QPATH}^2 + r_{Q\_QPATH}^2)}}{Q'} \qquad \text{Equation (10)}$$

The transmitter I/Q mismatch detection module 2402 determines the gain mismatch G between the I-path and the Q-path according to the I-path mismatch parameter $(1+\varepsilon_I)$ and the Q-path mismatch parameter $(1+\varepsilon_Q)$. The loop-back module 24 determines the transmitter I/Q mismatch parameter G by:

$$G = \frac{(1+\varepsilon_I)}{(1+\varepsilon_Q)} = \frac{\sqrt{(r_{I\_IPATH}^2 + r_{Q\_IPATH}^2)}}{\sqrt{(r_{I\_QPATH}^2 + r_{Q\_QPATH}^2)}} \cdot \frac{Q'}{I'} \qquad \text{Equation (11)}$$

where: $(1+\varepsilon_I)$ is the I-path mismatch parameter;

$(1+\varepsilon_Q)$ is the Q-path mismatch parameter;

$r_{I\_IPATH}^2(t)$ and $r_{Q\_IPATH}^2(t)$ are the in-phase and quadrature component of the down-converted RF signal r(t) respectively when the in-phase component $x_I(t)$ of the transmitter signal is the first non-zero signal I' and the quadrature component $x_Q(t)$ of the transmitter signal is a zero signal;

$r_{I\_QPATH}^2(t)$ and $r_{Q\_QPATH}^2(t)$ are the in-phase and quadrature component of the down-converted RF signal r(t) respectively when the in-phase component $x_I(t)$ of the transmitter signal is a zero signal and the quadrature component $x_Q(t)$ of the transmitter signal is the second non-zero signal Q'; and I' is the first non-zero in-phase component $x_I(t)$ of the transmitter signal, and Q' is the second non-zero quadrature component $x_Q(t)$ of the transmitter signal.

The transmitter I/Q mismatch parameter G may be transmitted and temporarily stored in a register or any memory unit in the transmitter I/Q mismatch compensation module 2200 so that the transmitter baseband module 220 can access the memory unit to obtain the transmitter I/Q mismatch parameter G and compensate the transmitter signal x(t) before outputting the compensated transmitter signal to the transmitter analog module 222. The transmitter baseband module 220 then reduces the effects of the I/Q mismatch of the transmitter path in the transmitter module 22 according to a gain compensation matrix of the transmitter I/Q mismatch parameter:

$$M_G = \begin{bmatrix} 1 & 0 \\ 0 & \frac{(1+\varepsilon_I)}{(1+\varepsilon_Q)} \end{bmatrix} \qquad \text{Equation (12)}$$

Figure 6:
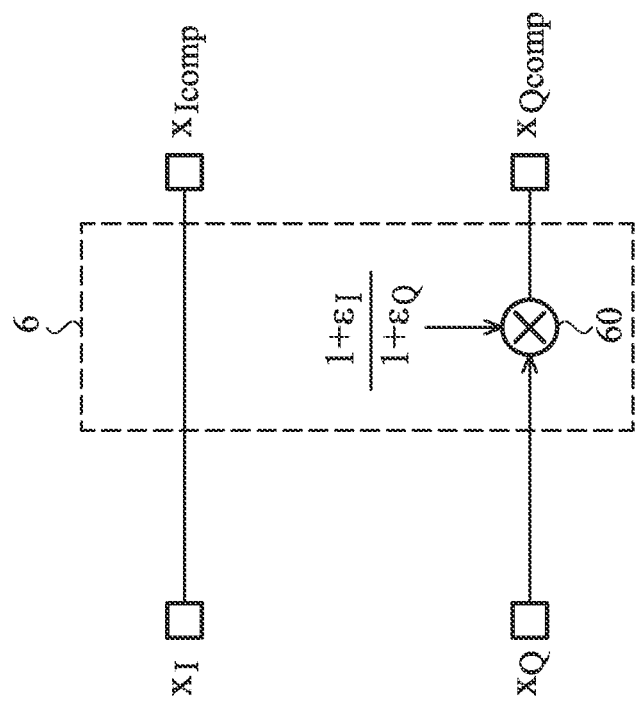
FIG. 6 is a circuit diagram of an exemplary IQ gain mismatch compensation circuit according to the present invention.

The phase compensation matrix $M_G$ may be implemented by a circuit depicted in FIG. 6. In one embodiment, the first non-zero signal I' equals the first non-zero signal Q', so that the transmitter I/Q mismatch detection module 2402 can determine the gain mismatch between the I-path and the Q-path according to the in-phase component $r_I(I', 0)$ and the quadrature component $r_Q(I', 0)$ of the down-converted RF signal, and the in-phase component $r_I(0, Q')$ and the quadrature component $r_Q(0, Q')$ of the down-converted RF signal, i.e.:

$$G = \frac{(1+\varepsilon_I)}{(1+\varepsilon_Q)} = \frac{\sqrt{(r_{I\_IPATH}^2(t) + r_{Q\_IPATH}^2(t))}}{\sqrt{(r_{I\_QPATH}^2(t) + r_{Q\_QPATH}^2(t))}}. \qquad \text{Equation (13)}$$

The transmitter I/Q mismatch compensation module 220 then reduces effects of I/Q mismatch of a transmitter path in the transmitter module 22 according to the gain compensation matrix of the transmitter I/Q mismatch parameter.

The first frequency divider 22214 divides the oscillation frequency of the oscillator signal by two to generate the first oscillator signal, and up-converts the transmitter signal with the first oscillator signal to generate the RF signal y(t), and the second frequency divider 24214 divides the oscillation frequency of the oscillator signal by two to generate the second oscillator signal, and down-converts the transmitter signal with the second oscillator signal to generate a baseband signal. The first and second oscillator signals for up-converting the transmitter signal x(t) and down-converting the RF signal y(t) are provided from the first frequency divider 22214 and the second frequency divider 24214 separately, resulting in different oscillator signal paths to the up-converted mixers 22208, 22210 and down-converted mixers 24200, 24202. Since the first and second oscillator signals are produced through different circuit elements and paths, there is an oscillator phase difference between the first and second oscillator signals, rendering an oscillator phase difference φ that needs to be compensated for. The oscillator phase difference φ is a phase difference of the signals on the transmitter path and the loopback path, arising from different oscillator signal paths to the up-converted mixers of the transmitter module 22 and the down-converted mixers of the loop-back module 24.

The oscillator phase difference φ is derived by the down-converted RF signal r(t). The transmitter baseband module 220 sets the in-phase and quadrature components of the transmitter signal to zero signals to determine the down-converted RF signal r(t) as a first oscillator phase difference parameter $r_{LO1}(t)$ at the oscillator mismatch detection and compensation module 2404. The first oscillator phase difference parameter $r_{LO1}(t)$ represents a phase difference between the first and second oscillator signals when the in-phase and quadrature components of the transmitter signal are 0. The transmitter baseband module 220 sets one of an in-phase component and a quadrature component of the transmitter signal to a zero signal to derive a first mismatch parameter of the transmitter I/Q mismatch parameter. Specifically, the transmitter baseband module 220 may set the in-phase component $x_I(t)$ of the transmitter signal to a non-zero constant signal and the quadrature component $x_Q(t)$ of the transmitter signal to a zero signal to determine the down-converted RF signal r(t) as a second oscillator phase difference parameter $r_{LO2}(t)$ at the oscillator mismatch detection and compensation module 2404. The second oscillator phase difference parameter $r_{LO2}(t)$ represents a phase difference between the first and second oscillator signals when the in-phase component of the transmitter signal is a DC voltage and the quadrature components of the transmitter signal is 0.

Next, the oscillator mismatch detection and compensation module 2404 determines an oscillator phase difference parameter according to the first and second oscillator phase difference parameters $r_{LO1}(t)$ and $r_{LO2}(t)$, and reduces the oscillator phase difference $\phi$ between the first and second oscillator signals according to the oscillator phase difference parameter $(-\theta_I'-\phi)$. The oscillator mismatch detection and compensation module 2404 determines the oscillator phase difference parameter $(-\theta_I'-\phi)$ according to a difference of the first and second oscillator phase difference parameters, or, $$(-\theta_I'-\phi)=r_{LO1}(t)-r_{LO2}(t) \qquad \text{Equation(14)}$$

The oscillator mismatch detection and compensation module 2404 performs a digital rotation operation on the down-converted RF signal r(t) with the oscillator phase difference parameter $(-\theta_I'-\phi)$ to reduce or remove the oscillator phase difference 4, resulting in a residue phase mismatch $-\theta_1''$ in the oscillator phase difference compensated signal r(t). The residue phase mismatch $-\theta_I'$ may be subsequently removed by the transmitter I/Q mismatch compensation module 2200 using the transmitter I/Q mismatch detection and compensation method of the embodiment of the present invention. Thus the oscillator mismatch detection and compensation module 2404 is configured to reduce the oscillator phase difference prior to the transmitter module reducing the transmitter I/Q mismatch of the transmitter path. The digital rotation of an angle $(-\theta_I'-\phi)$ may be implemented by a circuit provided in FIG. 7.

A receiver device (not shown) may be incorporated with the transmitter device 2 to form a transceiver device (not shown) in the communication device 10 in FIG. 1. The receiver device receives a downlink RF signal from the base station 12, down-converts the downlink RF signal by receiver mixers (not shown), and converts to digital baseband signals by receiver ADCs to be processed in a receiver baseband module (not shown). The downlink RF signal is also an orthogonal signal.

Those skilled in the art will recognize that some components not illustrated may be incorporated in the I-path and Q-path of the transmitter device 2, such as various low-pass, high-pass, and band-pass filters designed to remove unwanted signal components and buffer stages to enhance signal strength. However, the various filtering and buffer components introduced to the I-path and Q-path of the transceiver 1 may increase the phase and amplitude differences or mismatch between the in-phase and quadrature components of the signals in the transmitter device 2.

While various circuit functions are performed by different modules in the transmitter device 2, the modules may be separated, combined, or partially combined to perform the circuit functions illustrated in the embodiments of the present invention, such that the circuit functions may also be separated, combined, or partially combined without deviating from the principle of the invention.

Figure 4:
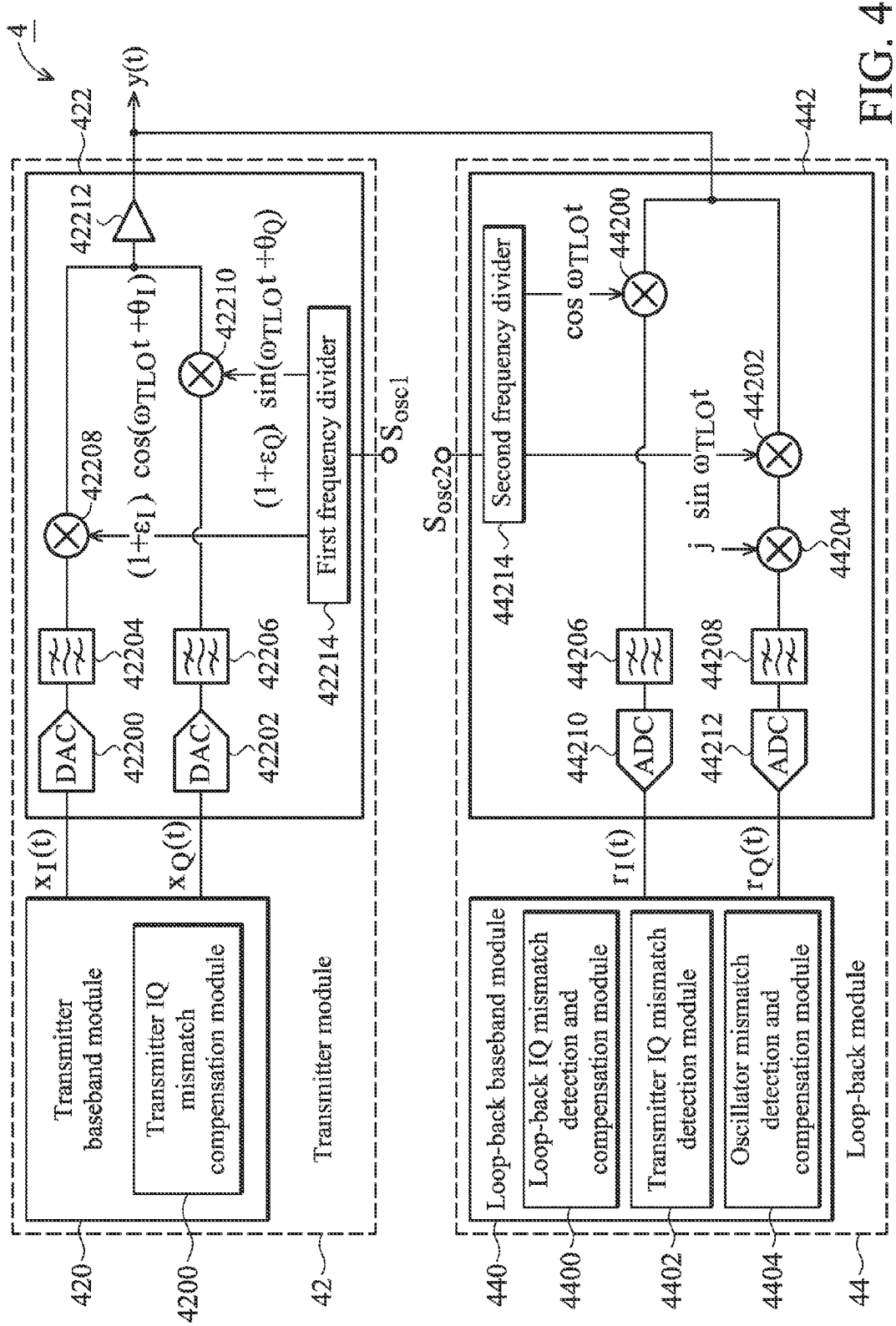
FIG. 4 is a block diagram of another exemplary device with I/Q mismatch compensation according to the present invention.

FIG. 4 is a block diagram of another exemplary transmitter device 4 capable of I/Q mismatch compensation according to one embodiment of the present invention.

The transmitter device 4 is identical to the transmitter device 2 in FIG. 2, except that the transmitter module 42 and the loop-back module 44 employ different sources of oscillator signals $S_{osc1}$, $S_{osc2}$. The oscillator signals $S_{osc1}$, $S_{osc2}$ provide substantially the same oscillator frequency and are originated from two separated oscillator units (not shown). The transmitter device 4 uses the same transmitter I/Q mismatch compensation technique as explained in the embodiments in the transmitter device 2.

Figure 5:
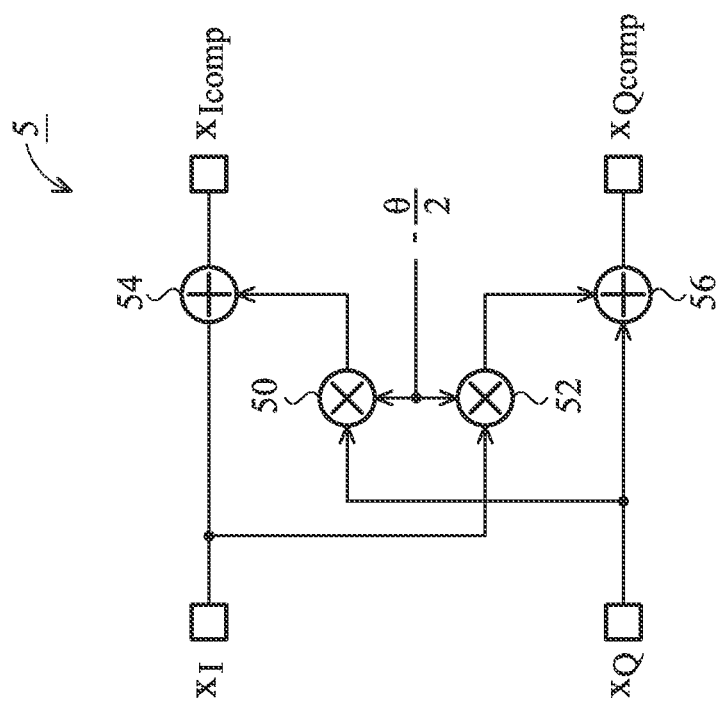
FIG. 5 is a circuit diagram of an exemplary IQ phase mismatch compensation circuit according to the present invention.

FIG. 5 is a circuit diagram of an exemplary IQ phase mismatch compensation circuit 5 according to one embodiment of the present invention, incorporated in the transmitter I/Q mismatch compensation module 2200 in FIG. 2 or the transmitter I/Q mismatch compensation module 4200 in FIG. 4. The IQ phase mismatch compensation circuit 5 comprises mixers 50 and 52, and adders 54 and 56. The mixer 50 is coupled to the adder 54. The mixer 52 is coupled to the adder 56. The mixer 50 adjusts a phase of the quadrature component of the transmitter signal by $(-\theta/2)$, where $(\theta/2)$ is the gain IQ mismatch. Similarly, the mixer 52 adjusts a phase of the in-phase component of the transmitter signal by $(-\theta/2)$, where $(\theta/2)$ is the gain IQ mismatch. The adder 54 combines the in-phase component of the transmitter RF signal and the adjusted quadrature component of the transmitter signal to reduce the gain I/Q mismatch and provide a compensated in-phase component of the transmitter RF to the transmitter analog module in FIG. 2 or FIG. 4. Likewise, the adder 56 combines the quadrature component of the transmitter RF signal and the adjusted in-phase component of the transmitter signal to reduce the phase I/Q mismatch and provide a compensated quadrature component of the transmitter RF to the transmitter analog module in FIG. 2 or FIG. 4.

FIG. 6 is a circuit diagram of an exemplary IQ gain mismatch compensation circuit 6 according to one embodiment of the present invention, incorporated in the transmitter I/Q mismatch compensation module 2200 in FIG. 2 or the transmitter I/Q mismatch compensation module 4200 in FIG. 4. The IQ gain mismatch compensation circuit 6 comprises a mixer 60. The mixer 60 adjusts an amplitude of the quadrature component of the transmitter signal by a factor $(1+\epsilon_I)/(1+\epsilon_Q)$, so that an amplitude of the in-phase component of the transmitter signal is substantially equivalent to the amplitude of the quadrature component of the transmitter signal, thereby providing the gain I/Q mismatch compensation.

Figure 7:
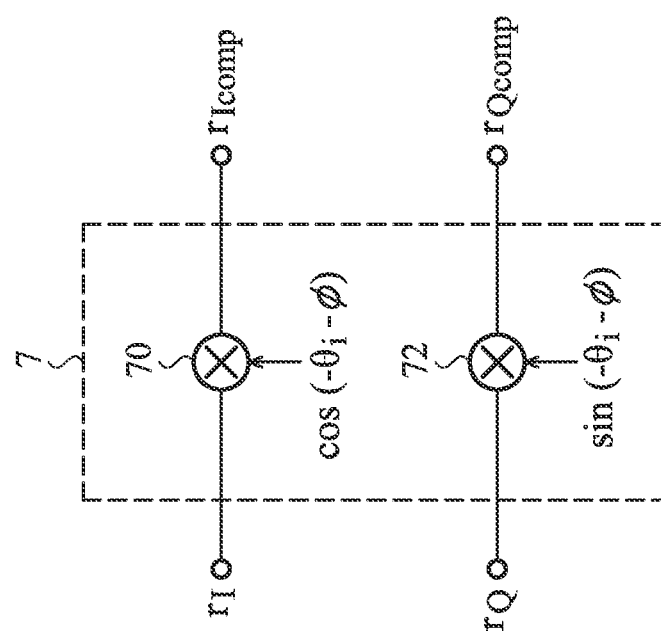
FIG. 7 is a circuit diagram of an exemplary oscillator phase difference compensation circuit according to the present invention.

FIG. 7 is a circuit diagram of an exemplary oscillator phase difference compensation circuit 7 according to one embodiment of the present invention, incorporated in the oscillator mismatch detection and compensation module 2404 in FIG. 2 or the transmitter oscillator mismatch detection and compensation module 4404 in FIG. 4. The oscillator phase difference compensation circuit 7 comprises mixers 70 and 72. The mixer 70 adjusts a phase of the in-phase component of the down-converted RF signal by $(-\theta_I'-\phi)$ to reduce the oscillator phase difference. The mixer 72 adjusts a phase of the quadrature component of the down-converted RF signal by $(-\theta_I'-\phi)$. The adjusted in-phase and quadrature components of the down-converted RF signal may be transmitted to the transmitter I/Q mismatch detection module in FIG. 2 or FIG. 4 for signal processing.

Figure 8:
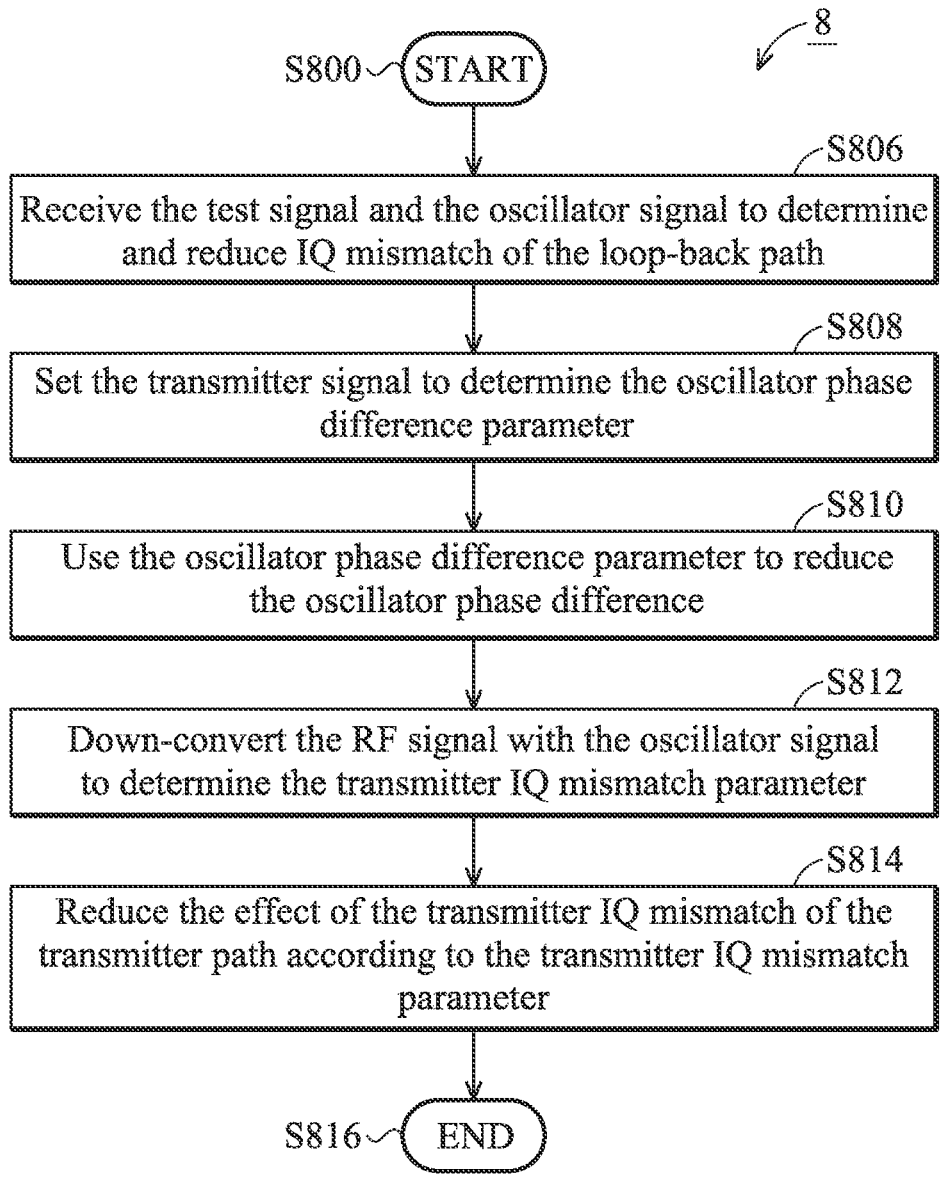
FIG. 8 is a flowchart of an exemplary I/Q mismatch and oscillator phase difference detection and compensation method according to present invention.

FIG. 8 is a flowchart of an exemplary IQ and oscillator phase difference detection and compensation method according to one embodiment of the present invention. The compensation method 8 may incorporate the I/Q mismatch compensation circuit in FIG. 2. The I/Q mismatch comprises phase and gain mismatch. The method is used in either a frequency division duplexing or a time division duplexing system.

Upon startup of the IQ and oscillator phase difference detection and compensation method 8, the transmitter circuit 2 is initiated in step S800 prior to uplink data transmission.

In step S806, the loop-back module 24 receives the test signal and the oscillator signal to determine and reduce the effects of the I/Q mismatch of the loop-back path. The I/Q mismatch of the loop-back path needs to be compensated for prior to the transmitter I/Q mismatch compensation, so that the loop-back module 24 may detect the transmitter IQ mismatch, and the local I/Q mismatch of the loop-back path does not affect the detection of the transmitter IQ mismatch, thereby allowing for a higher accuracy in determining the transmitter IQ mismatch. The test signal is provided from the test tone generator 28.

Figure 9:
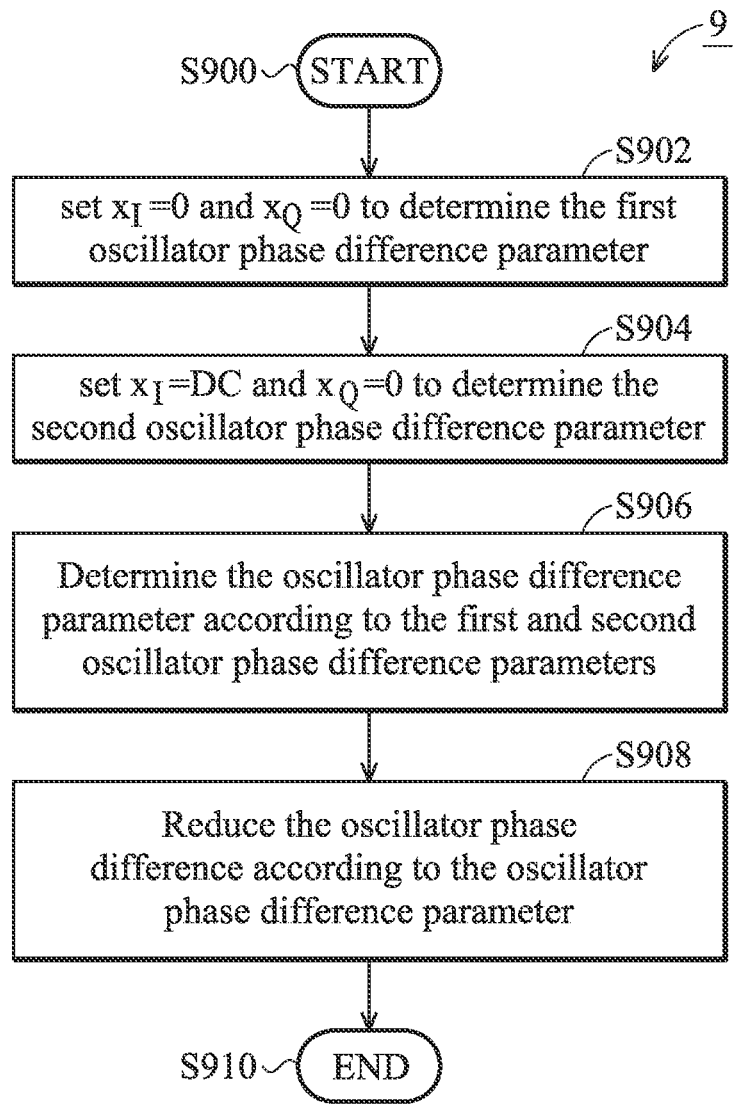
FIG. 9 is a flowchart of an exemplary oscillator phase difference detection and compensation method according to present invention.

In step S808, the transmission module 22 sets the transmitter signal x(t) to determine the oscillator phase difference parameter $(-\theta_I'-\phi)$. The transmitter oscillator 20 provides the oscillator signal to the transmission module 22 and the loop-back module 24 to perform modulation and demodulation, respectively. Since the oscillator signals are provided separately to the transmission module 22 and the loop-back module 24, the oscillator phase difference $\phi$ is arose from the different oscillator signal paths to the transmitter module 22 and the loop-back module 24. The oscillator phase difference $\phi$ between the transmitter path and the loop-back path has to be compensated for, so that the transmitter I/Q mismatch can be determined at a higher accuracy. FIG. 9 discloses a detailed method of determination of the oscillator phase difference parameter.

In step S810, the loop-back module 24 uses the phase mismatch parameter $(-\theta_I'-\phi)$ to reduce the oscillator phase difference $\phi$ by digitally rotating the phase of the down-converted RF signal r(t) by an angle $(-\theta_I'-\phi)$. The digital rotation may be implemented by the oscillator phase difference compensation circuit 7 in the FIG. 7. The down-converted RF signal r(t) still comprises the residue phase mismatch $(-\theta_I')$ after the digital rotation. The residue phase mismatch $(-\theta_I')$ can be reduced or removed using steps S812 and S814. Thus the reduction of the oscillator phase difference in step 810 has to be performed prior to reducing the transmitter I/Q mismatch of the transmitter path. FIG. 9 discloses the detailed method of the oscillator phase difference compensation.

Figure 10:
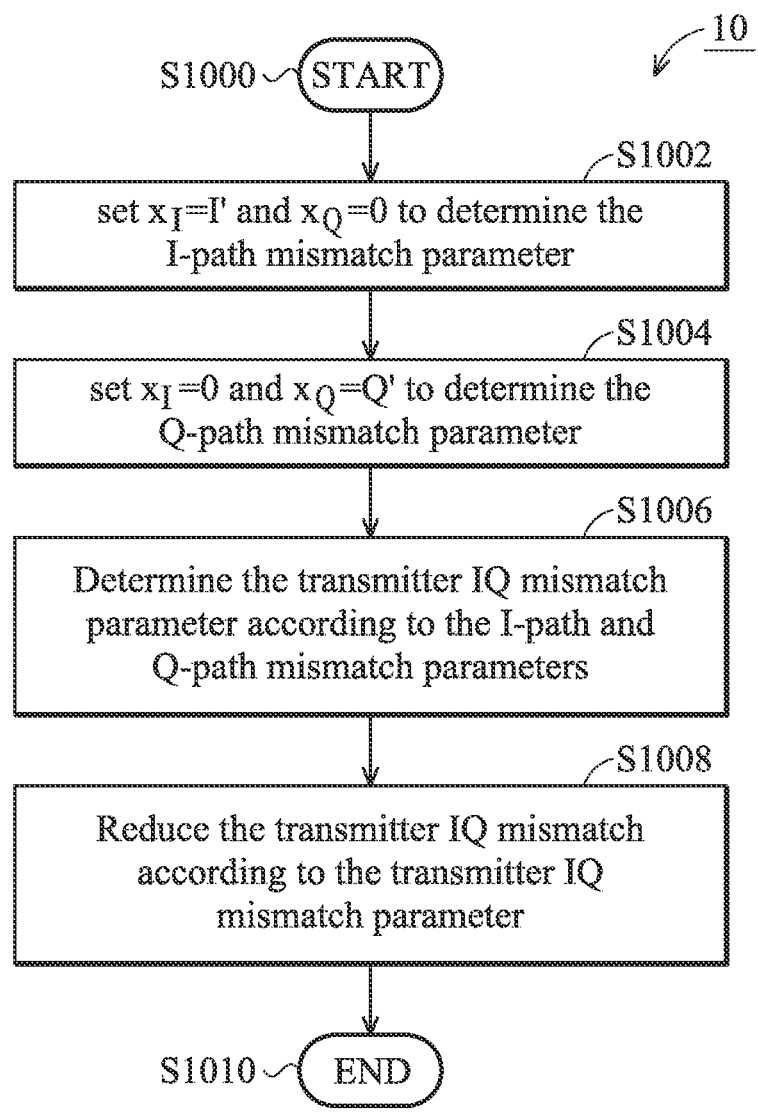
FIG. 10 is a flowchart of an exemplary I/Q mismatch detection and compensation method according to present invention.

In step S812, the loop-back module 24 down-converts the RF signal with the oscillator signal to determine the transmitter I/Q mismatch parameter. The transmitter I/Q mismatch parameter may represent the phase I/Q mismatch of the transmitter module 22, the gain I/Q mismatch of the transmitter module 22, or a combination thereof. FIG. 10 discloses a detailed method of determination of the transmitter IQ mismatch.

In step S814, the transmitter module 22 reduces the effects of the transmitter I/Q mismatch of the transmitter path according to the transmitter I/Q mismatch parameter, thereby providing the IQ matched RF signal for uplink data transmission and decreasing inter-channel interference and transmit power usage. FIG. 10 provides the detailed method of compensation of the transmitter IQ mismatch.

In step S816, the mismatch detection and compensation method 8 is completed.

The mismatch detection and compensation method 8 utilizes the loop-back module 24 that shares a common oscillator signal source (the transmitter oscillator 20) with the transmitter module 22 to detect and compensate for the transmitter IQ mismatch, leading to decreased circuit complexity and reduced manufacturing costs.

FIG. 9 is a flowchart of an exemplary oscillator phase difference calibration method according to one embodiment of the present invention, incorporated in the steps S808 and S810 in the method 8. The oscillator phase difference calibration method 9 may incorporate the transmitter circuit 2 in FIG. 2 and the oscillator phase difference compensation circuit 7 in the FIG. 7.

Upon startup, the transmitter circuit 2 is initiated to perform the oscillator phase difference calibration method 9 in step S900. The oscillator phase difference is the phase difference of the signals on the transmitter path and the loopback path, arising from different oscillator signal paths to the transmitter module 22 and the loop-back module 24.

In step S902, the transmitter module 22 sets the in-phase and quadrature components of the transmitter signal to zero signals to determine the first oscillator phase difference parameter $r_{LO1}$.

In step S904, the transmitter module 22 sets one of the in-phase component and the quadrature component of the transmitter signal to a non-zero constant signal and set the other one of the in-phase component and the quadrature component of the transmitter signal to a zero signal to determine a second oscillator phase difference parameter. In one example, the transmitter module 22 sets the in-phase component of the transmitter signal to the non-zero constant signal and the quadrature component of the transmitter signal to the zero signal to determine second oscillator phase difference parameter $r_{LO2}$. The non-zero constant signal may be, for example, 1.8V.

In step S906, the loop-back module 24 determines the oscillator phase difference parameter $(-\theta_I'-\phi)$ according to the difference of the first and second oscillator phase difference parameters.

In step S908, the loop-back module 24 reduces the oscillator phase difference 4 between the first and second oscillator signals according to the oscillator phase difference parameter $(-\theta_I'-\phi)$ by the oscillator phase difference compensation circuit 7 in the FIG. 7. The oscillator phase difference compensation circuit 7 adjusts the phase of the down-converted signal r(t) by $(-\theta_I'-\phi)$ to compensate for the oscillator phase difference 4, resulting in the residue phase mismatch $(-\theta_I')$ that needs to be further compensated for. The phase compensation of the residue phase mismatch $(-\theta_I')$ can be implemented by the I/Q mismatch calibration method 10 in FIG. 10, thus the methods 9 and 10 are used in conjunction, and in order, to substantially remove the oscillator phase difference.

In step S910, the oscillator phase difference calibration method 9 is stopped.

FIG. 10 is a flowchart of an exemplary I/Q mismatch calibration method 10 according to one embodiment of the present invention. The I/Q mismatch calibration method 10 may be incorporated in the steps S812 and S814 in the method 8, or may be used independently to correct the I/Q mismatch of a transmitter path in a transmitter device. The I/Q mismatch calibration method 10 may incorporate the transmitter circuit 2 in FIG. 2, the transmitter circuit 4 in FIG. 4, the IQ phase mismatch compensation circuit 5 in FIG. 5, and the IQ gain mismatch compensation circuit 6 in FIG. 6.

Upon startup of the method 10, the transmitter circuit 2 is initiated to perform the I/Q mismatch calibration method 10 in step S1000. Next in step S1002, the transmitter module 22 sets one of an in-phase component and a quadrature component of the transmitter signal to a zero signal to derive a first mismatch parameter of the transmitter I/Q mismatch parameter. In one example, the transmitter module 22 sets the in-phase component of the transmitter signal to the first non-zero signal and the quadrature component of the transmitter signal to the zero signal to determine the I-path mismatch parameter (first mismatch parameter). The first non-zero signal I' may be a DC signal, a sinusoidal signal, or any signal or signal combination that is not 0. For example, the first non-zero signal may be sin(ωt). The I-path mismatch parameter represents the phase or gain mismatch of the I-component on the I-path with reference to the zero signal on the Q-path in the transmitter analog module 222. In one embodiment, the I-path mismatch parameter represents the phase mismatch of the signal on the I-path relative to a 0 signal on the Q-path, and the loop-back module 24 determines the I-path mismatch parameter $\theta_I$ according to the in-phase component and the quadrature component of the down-converted RF signal ($r_{I\_IPATH}$, $r_{Q\_IPATH}$), as expressed in Equation (5). In another embodiment, the I-path mismatch parameter represents the gain mismatch of the signal on the I-path relative to a 0 signal on the Q-path, and the loop-back module 24 determines the I-path mismatch parameter $(1+\epsilon_I)$ according to the first non-zero signal I', in-phase component and the quadrature component of the down-converted RF signal ($r_{I\_IPATH}$, $r_{Q\_IPATH}$), as expressed by Equation (9).

In step S1004, the transmitter module 22 sets the other one of the in-phase component and the quadrature component of the transmitter signal to a zero signal to derive a second mismatch parameter of the transmitter I/Q mismatch parameter. In one example, the transmitter module 22 sets the in-phase component of the transmitter signal to the zero signal and the quadrature component of the transmitter signal to the second non-zero signal to determine the Q-path mismatch parameter (second mismatch parameter). The second non-zero signal Q' may be a DC signal, a sinusoidal signal, or any signal or signal combination that is not 0. The second non-zero signal may be, for example, 1.8V. The first and second non-zero signal may or may not be identical. The I-path mismatch parameter represents the phase or gain mismatch of the Q-component on the Q-path with reference to the zero signal on the I-path in the transmitter analog module 222. In one embodiment, the Q-path mismatch parameter represents the phase mismatch of the signal on the Q-path relative to a 0 signal on the I-path, and the loop-back module 24 determines the Q-path mismatch parameter $\theta_Q$ according to the in-phase component and the quadrature component of the down-converted RF signal, as expressed in Equation (7). In another embodiment, the Q-path mismatch parameter represents the gain mismatch of the signal on the Q-path relative to a 0 signal on the I-path, and the loop-back module 24 determines the I-path mismatch parameter $(1+\epsilon_Q)$ according to the second non-zero signal Q', in-phase component and the quadrature component of the down-converted RF signal ($r_{I\_IPATH}$, $r_{Q\_IPATH}$), as indicated by Equation (10).

In step S1006, the loop-back module 24 determines the transmitter I/Q mismatch parameter based on the I-path mismatch parameter and the Q-path mismatch parameter. The transmitter I/Q mismatch parameter represents the phase or gain mismatch between the signal components on the I-path and the Q-path in the transmitter analog module 222. In one embodiment, the transmitter I/Q mismatch parameter represents the phase mismatch of signals on the Q-path and the I-path, and the loop-back module 24 determines the transmitter I/Q mismatch parameter according to the I-path phase mismatch parameter $\theta_I$ and the Q-path phase mismatch parameter $\theta_Q$. The loop-back module 24 can determine the transmitter I/Q mismatch parameter $\theta$ by a difference of the I-path phase mismatch parameter $\theta_I$ and the Q-path phase mismatch parameter $\theta_Q$, i.e., $\theta=\theta_I-\theta_Q$. In another embodiment, the transmitter I/Q mismatch parameter represents the gain mismatch G of signals on the I-path and the Q-path, and the loop-back module 24 determines the transmitter I/Q mismatch parameter G according to the I-path gain mismatch parameter $(1+\epsilon_Q)$ and the Q-path gain mismatch parameter $(1+\epsilon_Q)$, as expressed in Equation (11). When the first non-zero signal I' equals the second non-zero signal Q', the loop-back module 24 determines the transmitter I/Q mismatch parameter G only according to the in-phase component and the quadrature component of the down-converted RF signal, as shown in Equation (13).

In step S1008, the transmitter module 22 reduces the transmitter I/Q mismatch according to the transmitter I/Q mismatch parameter. In one embodiment, the transmitter module 22 reduces the effects of the transmitter I/Q mismatch according to the phase compensation matrix $M_\theta$ of the transmitter I/Q mismatch parameter, represented by Equation (8). In another embodiment, the transmitter module 22 reduces the effects of the transmitter I/Q mismatch according to the gain compensation matrix $M_G$ of the transmitter I/Q mismatch parameter, represented by Equation (12). The gain compensation matrix $M_G$ can be realized by the IQ phase mismatch compensation circuit 5 in FIG. 5, and the gain compensation matrix $M_G$ can be implemented by the IQ gain mismatch compensation circuit 6 in FIG. 6.

In step S1010, the I/Q mismatch detection and compensation method 10 is completed.

Although the transmitter device 2 is used as an example to explain the operation of the method 10, the transmitter device 4 may also incorporate the method 10 to detect and correct the transmitter I/Q mismatch thereof. Persons skilled in the arts may adopt the transmitter I/Q mismatch calibration method 10 in a transmitter device without deviating from principle of the invention.

Figure 11:
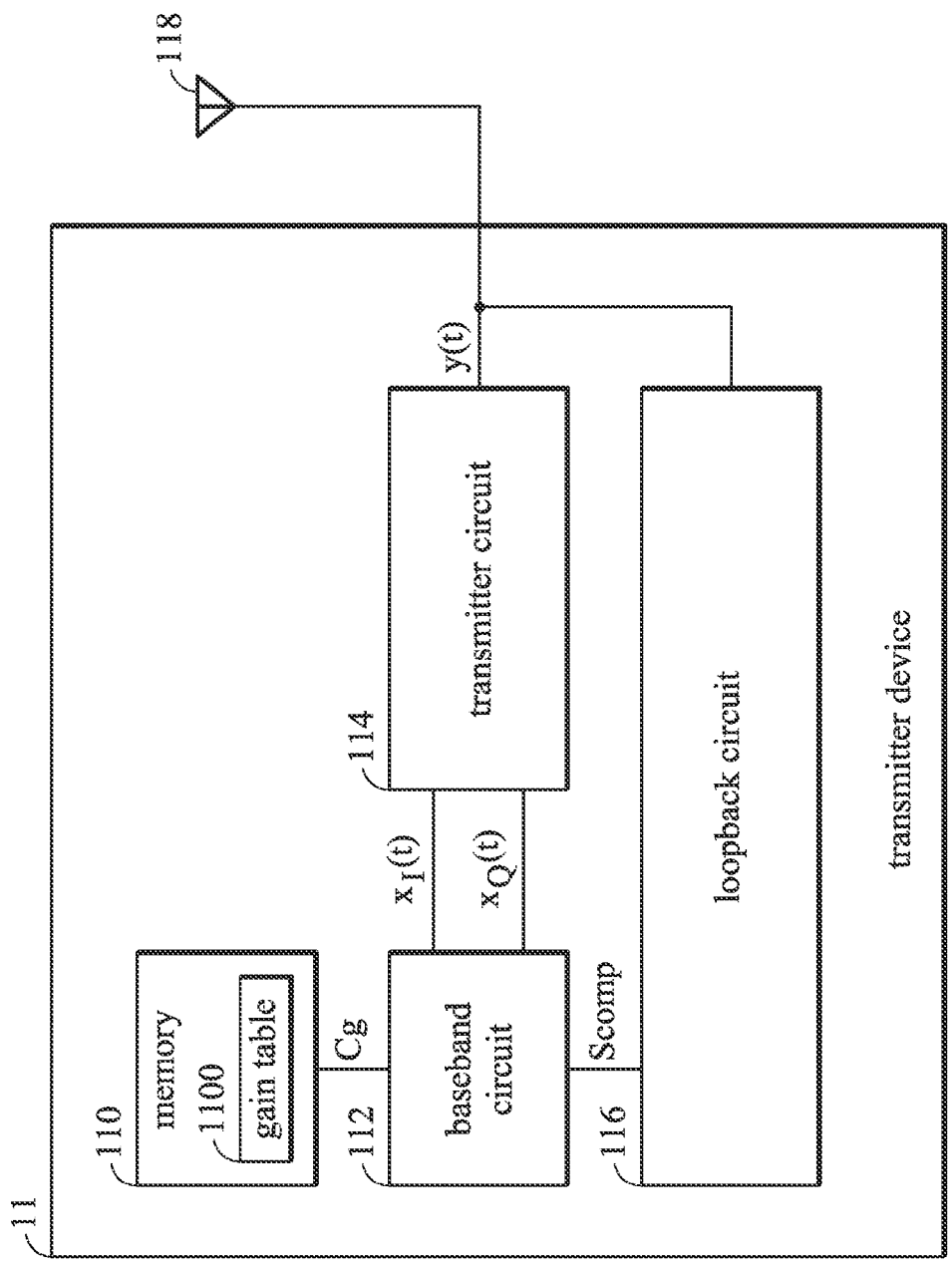
FIG. 11 is a block diagram of a transmitter device 11 with I/Q mismatch compensation according to an embodiment of the invention.

FIG. 11 is a block diagram of a transmitter device 11 with I/Q mismatch compensation according to an embodiment of the invention, including a memory 110, a baseband circuit 112, a transmitter circuit 114, a loopback circuit 116, and an antenna 118. The transmitter device 11 can be used in either a FDD or TDD system. The I/Q mismatch compensation includes compensations for phase and gain (amplitude) mismatch. The transmitter device 11 contains a plurality of slices and outputs an output signal y(t) with a plurality of gain configurations produced by a predefined combination of the slices. Furthermore, since each slice may not be identical, they may contain different IQ mismatches to one another. Therefore, the transmitter device 11 can perform I/Q mismatch detection and compensation for each predefined combination of the slices.

Figure 12:
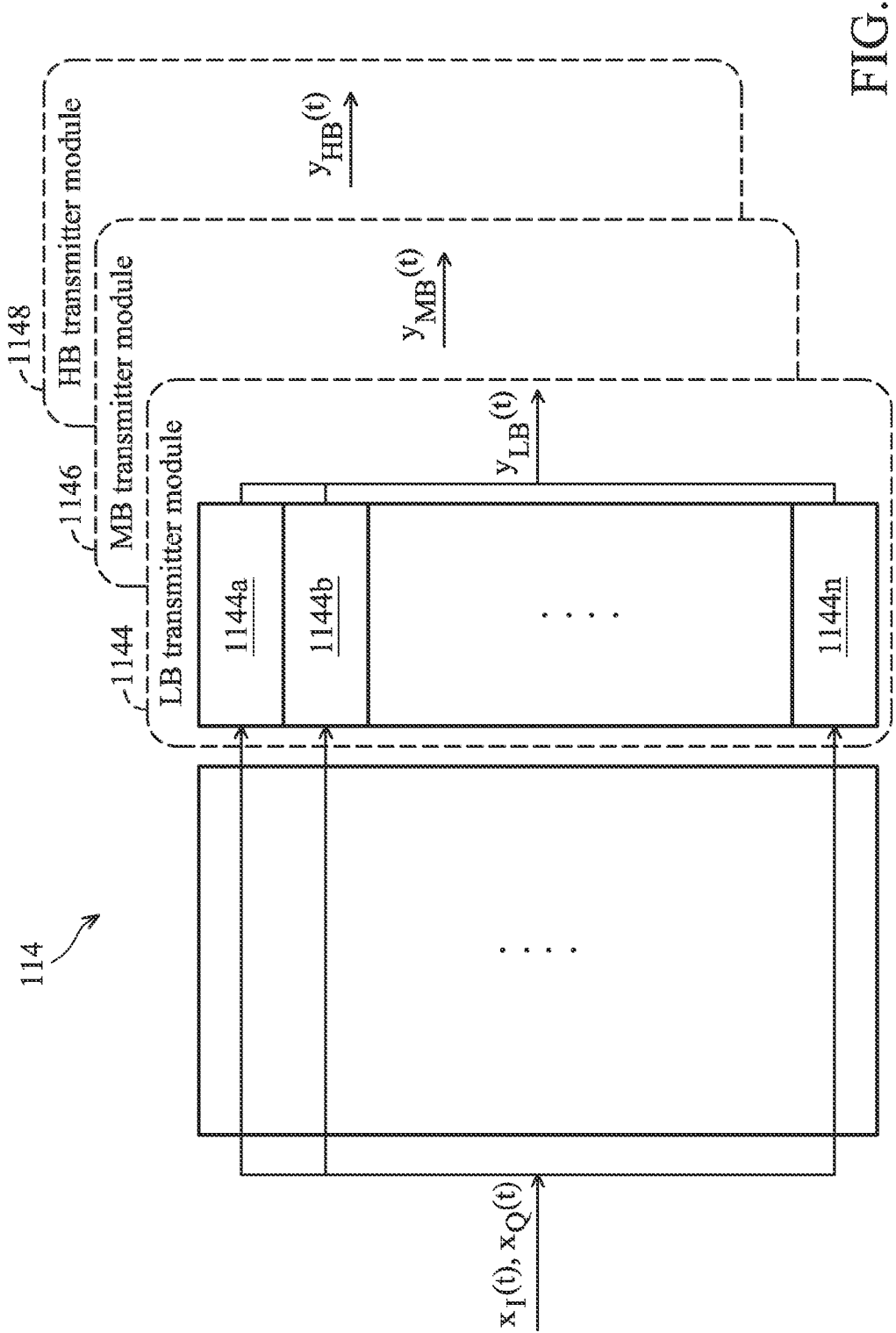
FIG. 12 is a block diagram of the transmitter circuit 114 in FIG. 11.

Accordingly, the transmitter circuit 114 includes the plurality of slices as detailed in FIG. 12, wherein each slice may produce the same or different gains. The transmitter circuit 114 receives a baseband signal which includes the in-phase component $x_I(t)$ and quadrature component $x_Q(t)$ from the baseband circuit 112 and converts and amplifies the baseband signal $x_I(t)/x_Q(t)$ into the output signal y(t) by a combination of slices defined by the gain configuration Cg. For example, the transmitter circuit 114 includes n slices, and converts and amplifies the baseband signal $x_I(t)/x_Q(t)$ into the output signal y(t) with 2 slices defined by the gain configuration Cg. In some embodiments, the transmitter circuit 114 may output the output signal y(t) at several RF frequency bands, e.g., a low-band (LB) less than 1 G Hz, a mid-band (MB) around 2 G Hz, and a high-band (HB) exceeding 2.5 G Hz, The output signal y(t) may be transmitted over a communication channel via the antenna 118.

The memory 110 includes a gain table 1100 which stores the plurality of gain configurations Cg, wherein each gain configuration Cg defines a combination of the slices. For example, the gain configuration Cg may be 1 predefined slice, 2 predefined slices, 3 predefined slices, 4 predefined slices, etc. The memory 110 may be volatile or non-volatile memory. For example, the memory 110 may be an electrical fuse (eFuse), and the gain table 1100 is programmed into the eFuse for one time by forcing a high current density through a conductor link to completely rupture it or make its resistance significantly higher. The memory 110 may also be registers, and the gain table 1100 is programmed into the registers upon power-up or during operations. In some embodiments, the memory 110 may be located outside of the transmitter device 11, and therefore the gain table 1100 can be accessed from outside of the transmitter device 11. The baseband circuit 112 may select a gain configuration Cg from the plurality of gain configurations stored in the gain table 1100 in the memory 110 to meet a target gain, which may be determined by a transmit power control mechanism or quality of a received signal. The selected gain configuration Cg is then used to configure the transmitter circuit 114 to generate the output signal y(t).

The loop-back circuit 116 can retrieve the output signal y(t) from the transmitter circuit 114 to determine transmitter I/Q mismatch Scomp of the transmitter circuit 114. Subsequently, the baseband circuit 112 can compensate for the transmitter I/Q mismatch Scomp of the transmitter circuit 114 by using the plurality of gain configurations to generate the baseband signal $x_I(t)/x_Q(t)$ to the transmitter circuit 114. The transmitter I/Q mismatch Scomp of the transmitter circuit 114 is represented by the transmitter I/Q mismatch parameter described in the preceding paragraphs, i.e., the transmitter I/Q mismatch parameter may be the phase compensation matrix $M_\theta$ defined by Equation (8), the gain compensation matrix $M_G$ defined by Equation (12), or a combination thereof.

The transmitter I/Q mismatch compensation may be performed by using the gain configurations when the transmitter device is powered up. For example, upon power-up, the baseband circuit 112 may generate and output a test baseband signal $x_{It}(t)/x_{Qt}(t)$ to the transmitter circuit 114, which in turn convert the test baseband signal $x_{It}(t)/x_{Qt}(t)$ into an output signal $y_1(t)$ according to a first gain configuration. The loop-back circuit 116 retrieves the output signal $y_1(t)$ from the transmitter circuit 114 to determine transmitter I/Q mismatch $Scomp_1$ of the transmitter circuit 114 by using the first gain configuration, and thus the baseband circuit 112 can compensate for the transmitter I/Q mismatch $Scomp_1$ of the transmitter circuit 114 by using the first gain configuration. Next, the transmitter circuit 114 continues converting the test baseband signal $x_{It}(t)/x_{Qt}(t)$ into an output signal $y_2(t)$ by using a second gain configuration, which is retrieved by the loop-back circuit 116 to determine transmitter I/Q mismatch $Scomp_2$ of the transmitter circuit 114 by using the second gain configuration, and thus the baseband circuit 112 can compensate for the transmitter I/Q mismatch $Scomp_2$ of the transmitter circuit 114 by using the second gain configuration. The transmitter I/Q mismatch detection and compensation may continue the rest of gain configurations stored in the memory 110. Upon completion of the compensation, the transmitter I/Q mismatch for all gain configurations are performed, and the baseband circuit 112 can compensate for the baseband signal $x_I(t)/x_Q(t)$ according to the operational gain configuration and output the compensated baseband signal $x_I(t)/x_Q(t)$ to the transmitter circuit 114 in the normal operations. The transmitter I/Q mismatch parameters for different gain configuration may be stored in the memory 110 for later uses.

In some embodiments, the transmitter I/Q mismatch detection and compensation may be performed for all operational frequency bands too, e.g., for the low-band, mid-band, and high-band by the above procedure. That is, the transmitter circuit 114 may convert the test baseband signal $x_{It}(t)/x_{Qt}(t)$ into an output signal $y_{LB}(t)$ at the low-band range, which is retrieved by the loop-back circuit 116 to determine transmitter I/Q mismatch $Scomp_{LB}$ of the transmitter circuit 114 for the low-band range, and subsequently, the baseband circuit 112 can compensate for the transmitter I/Q mismatch $Scomp_{LB}$ of the transmitter circuit 114 for the low-band range. The transmitter I/Q mismatch detection and compensation may continue the mid-band, high-band, and other band ranges. After the compensation is completed, the transmitter I/Q mismatch for all frequency bands are performed, and the baseband circuit 112 can compensate for the baseband signal $x_I(t)/x_Q(t)$ according to the operational band and output the compensated baseband signal $x_I(t)/x_Q(t)$ to the transmitter circuit 114 in the normal operations. The transmitter I/Q mismatch for different frequency bands may also be stored in the memory 110 for later use.

In one embodiment shown by FIG. 12, the transmitter circuit 114 includes 3 sets of transmitter modules 1144, 1146 and 1148 for the frequency bands LB, MB, and HB, where the frequency band LB is less than 1 G Hz, the frequency band MB is around 2 G Hz, and the frequency band HB exceeds 2.5 G Hz. Each set of transmitter modules contains a plurality of slices. For example, the LB transmitter modules 1144 may contain n slices numbered as 1144a, 1144b, . . . , 1144n, wherein the n slices may be the same or different. The transmitter circuit 114 may switch between the 3 sets of transmitter modules to up-convert the baseband signal $x_I(t)/x_Q(t)$ to the predetermined frequency band.

The gain configuration can be used by the transmitter circuit 114 to turn on the selected combination of slices and to switch the operational frequency band. Moreover, during the I/Q mismatch compensation and the normal operation, the transmitter circuit 114 can receive the baseband signal $x_I(t)/x_Q(t)$ from the baseband circuit 112, converts and amplifies the baseband signal $x_I(t)/x_Q(t)$ into the output signal $y_{LB}(t)$, $y_{MB}(t)$ or $y_{HB}(t)$ by the selected combination of slices and the selected frequency band. The frequency band may include a central frequency and a bandwidth.

Figure 13:
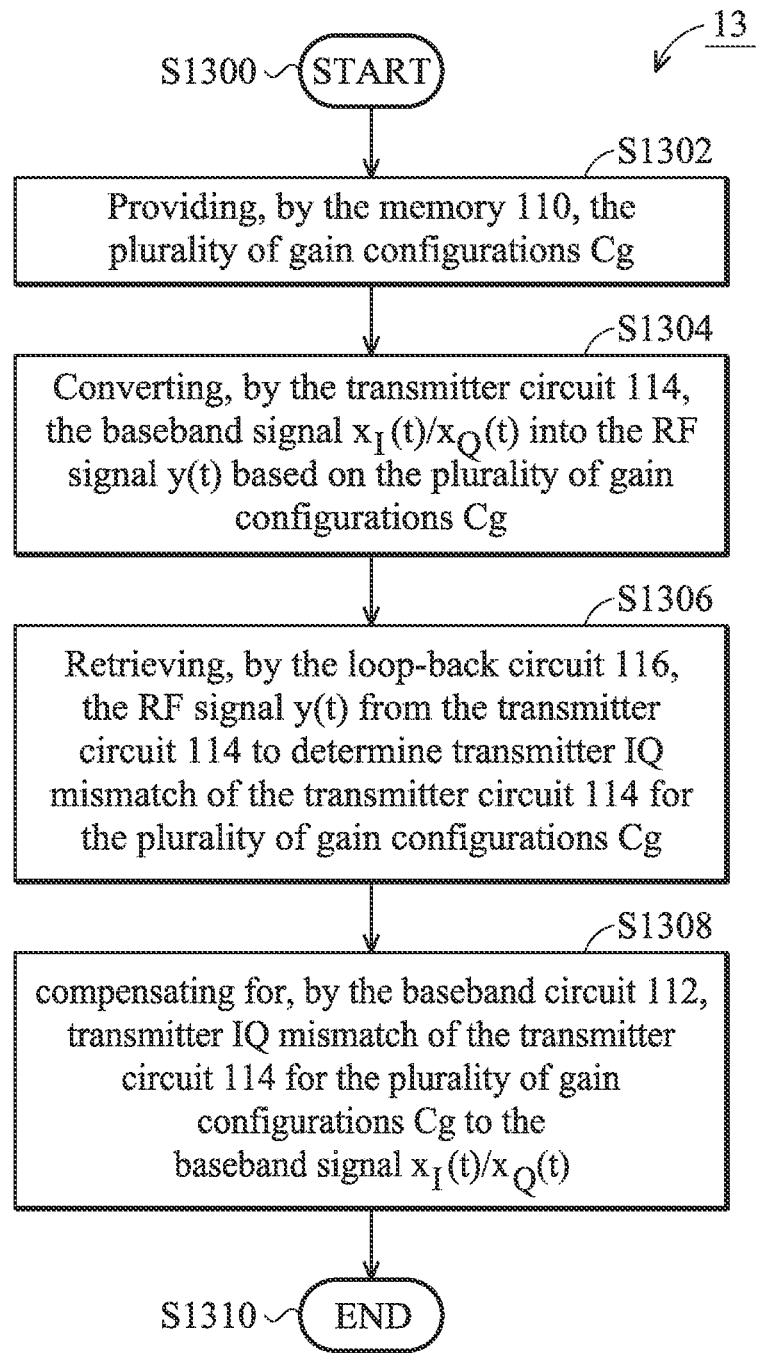
FIG. 13 is a flowchart of a method compensating for I/Q mismatch compensation in a transmitter device according to an embodiment of the invention.

The gain and phase I/Q mismatch arises from the difference of the I-path and Q-path in each slice. The transmitter circuit 114 is configured to perform the transmitter I/Q mismatch compensation, including the gain and phase I/Q mismatch compensation, by using each gain configuration and for each frequency band upon power-up. I/Q mismatch FIG. 13 is a flowchart of a method 13 which determines I/Q mismatch in a transmitter device according to an embodiment of the invention, incorporating the transmitter device 11 in FIG. 11 and the transmitter circuit 114 in FIG. 12. The method 13 performs the transmitter I/Q mismatch determination and compensation for each gain configuration available to the transmitter device 11.

Upon power-up, the method 13 is initiated (S1300), and the plurality of gain configurations Cg in the gain table 1100 are provided by the memory 110 (S1302).

Next, the method 13 converts the baseband signal $x_I(t)/x_Q(t)$ from the baseband circuit 112 into the output signal y(t) based on at least one of the plurality of gain configuration Cg in the gain table 1100 (S1304). In turn, the output signal y(t) is retrieved by the loop-back circuit 116 to determine transmitter I/Q mismatch of the transmitter circuit 114 by using the plurality of gain configurations Cg. The transmitter I/Q mismatch Scomp of the transmitter circuit 114 may be represented by the transmitter I/Q mismatch parameter, including the phase compensation matrix $M_\theta$ defined by Equation (8), the gain compensation matrix $M_G$ defined by Equation (12), or a combination thereof.

The transmitter I/Q mismatch Scomp of the transmitter circuit 114 may be stored in the memory 110 for later use. In normal operation, the transmitter I/Q mismatch Scomp can be compensated by the baseband circuit 112 by using the plurality of gain configurations Cg to compensated baseband signal $x_I(t)/x_Q(t)$ (S1308). The compensated baseband signal $x_I(t)/x_Q(t)$ is then output to the transmitter circuit 114 for data transmissions.

The method 13 is then completed (S1310).

Figure 14:
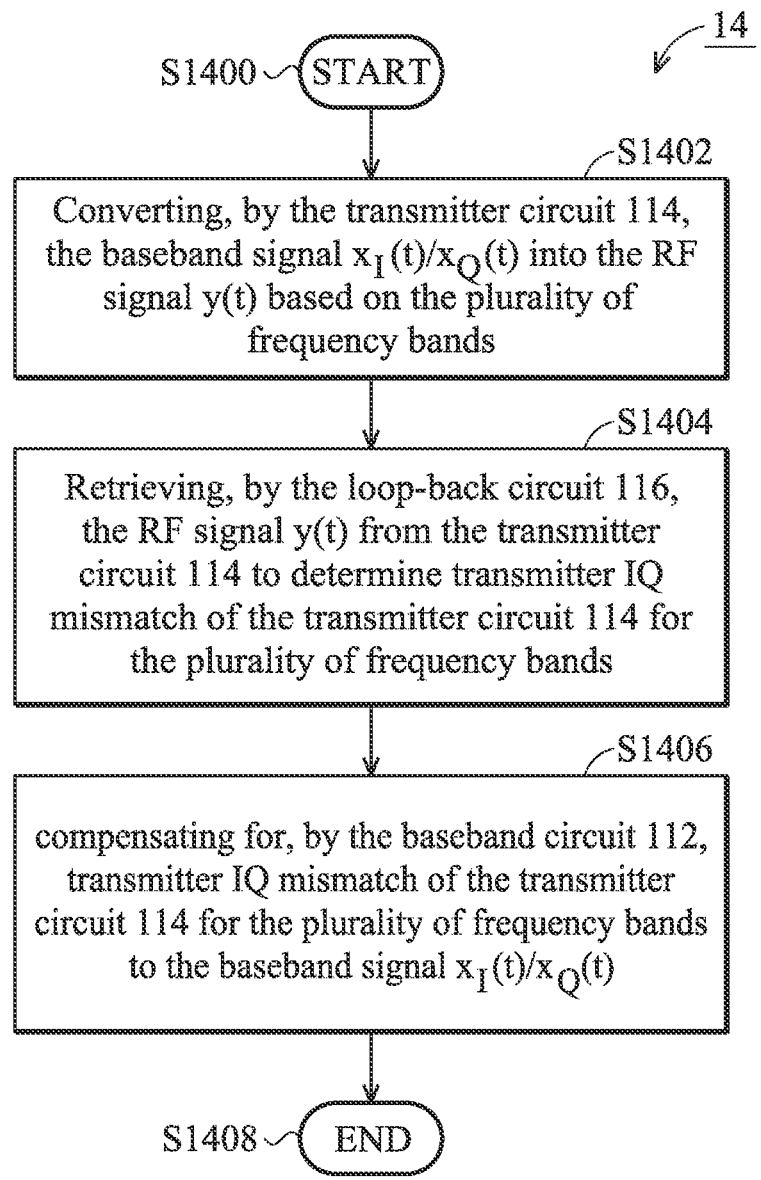
FIG. 14 is a flowchart of a method compensating for I/Q mismatch compensation in a transmitter device according to another embodiment of the invention.

FIG. 14 is a flowchart of a method 14 which determines I/Q mismatch in a transmitter device according to another embodiment of the invention, incorporating the transmitter device 11 in FIG. 11 and the transmitter circuit 114 in FIG. 12. The method 14 performs the transmitter I/Q mismatch determination and compensation for each frequency band available to the transmitter device 11.

Upon power-up, the method 14 is initiated (S1400). The method 14 can be performed independently to or jointly with the method 13, and can be performed before, after, or concurrently with the method 13. The frequency band may cover a central frequency and an operational frequency bandwidth. For example, the frequency band LB is centered at 1 GHz over a 20 MHz bandwidth, the frequency band MB centered at 2 G Hz over 50 MHz, and the frequency band HB is centered at 2.5 G Hz over 100 MHz.

Next, the method 14 converts the baseband signal $x_I(t)/x_Q(t)$ from the baseband circuit 112 into the output signal $y_{LB}(t)$, $y_{MB}(t)$, or $y_{HB}(t)$ based on each available frequency band (S1402). In turn, the output signal $y_{LB}(t)$, $y_{MB}(t)$, or $y_{HB}(t)$ is retrieved by the loop-back circuit 116 to determine transmitter I/Q mismatch of the transmitter circuit 114 for the plurality of frequency bands. The transmitter I/Q mismatch Scomp of the transmitter circuit 114 may be represented by the transmitter I/Q mismatch parameter, including the phase compensation matrix $M_\theta$ defined by Equation (8), the gain compensation matrix $M_G$ defined by Equation (12), or a combination thereof.

The transmitter I/Q mismatch Scomp of the transmitter circuit 114 for the plurality of frequency bands may be stored in the memory 110 for later use. In normal operation, the transmitter I/Q mismatch Scomp can be compensated for the operational frequency band by the baseband circuit 112 to compensate baseband signal $x_I(t)/x_Q(t)$ (S1406). The compensated baseband signal $x_I(t)/x_Q(t)$ is then output to the transmitter circuit 114 for data transmissions.

The method 14 is then completed (S1408).

Figure 15:
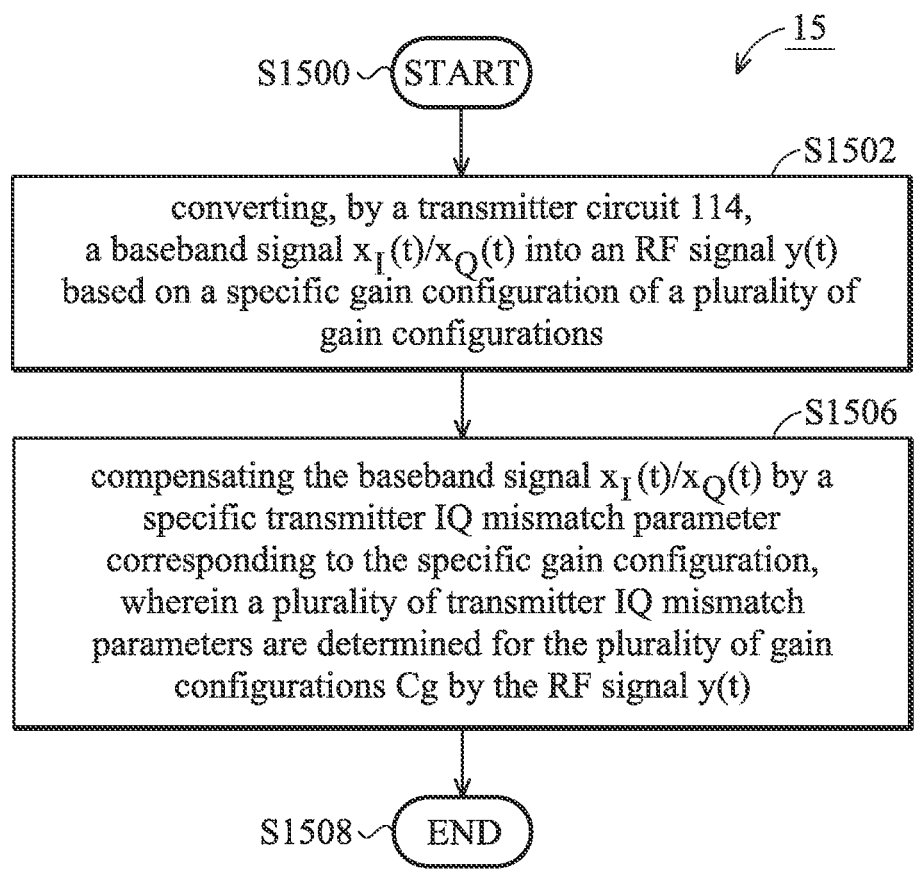
FIG. 15 is a flowchart of an I/Q mismatch compensation method 15 according to another embodiment of the invention.

FIG. 15 is a flowchart of a method 15 which uses the transmitter IQ mismatches Scomp determined in the methods 13 or 14 for I/Q mismatch compensation. The method 15 may incorporate the transmitter device 11 in FIG. 11 and the transmitter circuit 114 in FIG. 12.

Upon power-up, the method 15 is initiated (S1500), and the transmitter IQ mismatches Scomp for all gain configurations Cg are provided by the memory 110. The transmitter I/Q mismatch Scomp of the transmitter circuit 114 may be represented by the transmitter I/Q mismatch parameter, including the phase compensation matrix $M_\theta$ defined by Equation (8), the gain compensation matrix $M_G$ defined by Equation (12), or a combination thereof.

In a normal operation, the transmitter circuit 114 may select a specific gain configuration from the gain table 1100 in the memory 110. Then the method 15 converts a baseband signal xI(t)/xQ(t) from the baseband circuit 112 into the output signal y(t) based on the specific gain configuration of the plurality of gain configurations (S1502). The output signal y(t) is retrieved by the loop-back circuit 116 from the transmitter circuit 114.

Finally, the method 15 selects a specific transmitter I/Q mismatch parameter corresponding to the specific gain configuration used by the transmitter circuit 114 and compensates the baseband signal xI(t)/xQ(t) by the specific transmitter I/Q mismatch parameter by a baseband circuit 112 (S1506). The specific transmitter I/Q mismatch parameter may include the phase compensation matrix MO defined by Equation (8), the gain compensation matrix MG defined by Equation (12), or a combination thereof. The plurality of transmitter IQ mismatches are determined by using the plurality of gain configurations by the retrieved RF signal y(t) in the methods 13 and 14, and the specific transmitter I/Q mismatch parameter is determined by the retrieved RF signal y(t), which is converted in response to the specific gain configuration, from the loop-back circuit 116.

In some embodiments, the plurality of the transmitter IQ mismatches Scomp are also provided for all frequency bands. The frequency band may cover a central frequency and an operational frequency bandwidth. For example, the frequency band LB is centered at 1 GHz over a 20 MHz bandwidth, the frequency band MB centered at 2 G Hz over 50 MHz, and the frequency band HB is centered at 2.5 G Hz over 100 MHz. The method 15 may select a specific transmitter I/Q mismatch parameter corresponding to the specific frequency band adopted by the transmitter circuit 114 and compensates the baseband signal xI(t)/xQ(t) by the specific transmitter I/Q mismatch parameter by a baseband circuit 112. The plurality of transmitter IQ mismatches are determined for the plurality of frequency bands by the retrieved RF signal y(t) in the methods 13 and 14. The specific transmitter I/Q mismatch parameter is determined by the retrieved RF signal y(t), which is converted in response to the specific gain configuration, from the loop-back circuit 116. Again, the specific transmitter I/Q mismatch parameter may include the phase compensation matrix MO defined by Equation (8), the gain compensation matrix MG defined by Equation (12), or a combination thereof.

The method 15 is then completed (S1508).

The embodiments in FIGS. 11 through 15 provide implementations for the transmitter device to compensate the transmitter I/Q mismatch for various gain configurations and frequency bands.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

Information and signals may be represented using any of a variety of different technologies and techniques. For example, data, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A transmitter device with I/Q mismatch compensation, comprising:
a transmitter circuit, configured to convert a baseband signal into an RF signal based on a specific gain configuration of a plurality of gain configurations, wherein the transmitter circuit comprises a plurality of slices, and each of the plurality of gain configurations defines a combination of the plurality of slices of the transmitter circuit;
a loop-back circuit, configured to retrieve the RF signal from the transmitter circuit; and
a baseband circuit, configured to compensate the baseband signal by a specific transmitter I/Q mismatch parameter corresponding to the specific gain configuration, wherein a plurality of transmitter I/Q mismatch parameters are determined for the plurality of gain configurations by the RF signal retrieved from the loop-back circuit.

2. The transmitter device of claim 1, wherein the loop-back circuit is configured to determine the plurality of transmitter I/Q mismatch parameters of the transmitter circuit for the plurality of gain configurations upon power-up.

3. The transmitter device of claim 1, wherein the transmitter circuit is configured to up-convert the baseband signal into the RF signal based on a specific frequency band of a plurality of frequency bands;
the loop-back circuit is configured to retrieve the RF signal from the transmitter circuit; and
the baseband circuit is configured to compensate the baseband signal by the specific transmitter I/Q mismatch parameter corresponding to the specific frequency band, wherein the plurality of transmitter I/Q mismatch parameters are determined for the plurality of frequency bands by the RF signal retrieved from the loop-back circuit.

4. The transmitter device of claim 1, wherein the transmitter circuit is configured to up-convert the baseband signal into the RF signal using an oscillator signal, and the loop-back circuit is configured to down-convert the RF signal into the baseband signal using the oscillator signal.

5. The transmitter device of claim 1, wherein each of the plurality of transmitter I/Q mismatch parameters indicates a phase mismatch and a gain mismatch of a transmitter path in the transmitter circuit.

6. The transmitter device of claim 5, wherein
the RF signal comprises an in-phase component and a quadrature component;
the transmitter circuit is arranged to set the in-phase component of the RF signal to a first non-zero signal and the quadrature component of the RF signal to a zero signal to generate a first down-converted RF signal, and the loop-back circuit is arranged to determine an I-path mismatch parameter according to the first down-converted RF signal;
the transmitter circuit is arranged to set the in-phase component of the RF signal to the zero signal and the quadrature component of the RF signal to a second non-zero signal to generate a second down-converted RF signal, and the loop-back circuit is arranged to determine a Q-path mismatch parameter according to the second down-converted RF signal; and
the loop-back circuit is arranged to determine the phase mismatch of each transmitter I/Q mismatch parameter by a difference of the I-path mismatch parameter and the Q-path mismatch parameter, or determine the gain mismatch of each transmitter I/Q mismatch parameter by a ratio of the I-path mismatch parameter and the Q-path mismatch parameter.

7. A method executed by a transmitter device for improving signal quality by improving I/Q mismatch in a transmitted signal, the method, comprising:
converting a baseband signal into an RF signal based on a specific gain configuration of a plurality of gain configurations, wherein the transmitter device comprises a plurality of slices, and each of the plurality of gain configurations defines a combination of the plurality of slices of the transmitter device; and
reducing a transmitter I/Q mismatch by compensating the baseband signal by a specific transmitter I/Q mismatch parameter corresponding to the specific gain configuration, wherein a plurality of transmitter I/Q mismatch parameters are determined for the plurality of gain configurations by the RF signal.

8. The method of claim 7, wherein the plurality of transmitter I/Q mismatch parameters are determined for the plurality of gain configurations upon power-up of the transmitter device.

9. The method of claim 7, wherein converting comprises up-converting the baseband signal into the RF signal based on a specific frequency band of a plurality of frequency bands.

10. The method of claim 7, wherein each of the plurality of transmitter I/Q mismatch parameters indicates a phase mismatch and a gain mismatch of a transmitter path in a transmitter circuit.

11. The method of claim 10, wherein
the RF signal comprises an in-phase component and a quadrature component;
the method further comprises: setting the in-phase component of the RF signal to a first non-zero signal and the quadrature component of the RF signal to a zero signal to generate a first down-converted RF signal,
determining an I-path mismatch parameter according to the first down-converted RF signal;
setting the in-phase component of the RF signal to the zero signal and the quadrature component of the RF signal to a second non-zero signal to generate a second down-converted RF signal,
determining a Q-path mismatch parameter according to the second down-converted RF signal; and
determining the phase mismatch of each transmitter I/Q mismatch parameter by a difference of the I-path mismatch parameter and the Q-path mismatch parameter, or determining the gain mismatch of each transmitter I/Q mismatch parameter by a ratio of the I-path mismatch parameter and the Q-path mismatch parameter.

12. A transmitter device with I/Q mismatch compensation, comprising:
a transmitter circuit, configured to convert a baseband signal into an RF signal based on one of a plurality of gain configurations, wherein the transmitter circuit comprises a plurality of slices, and each of the plurality of gain configurations defines a combination of the plurality of slices of the transmitter circuit;
a loop-back circuit, configured to retrieve the RF signal from the transmitter circuit; and
a baseband circuit, configured to determine a plurality of transmitter I/Q mismatch parameters for the plurality of gain configurations, respectively.

13. The transmitter device of claim 12, wherein the loop-back circuit is configured to determine the transmitter I/Q mismatch of the transmitter circuit for the plurality of gain configurations upon power-up.

14. The transmitter device of claim 12, wherein the transmitter circuit is configured to up-convert the baseband signal into the RF signal in a plurality of frequency bands;
- the loop-back circuit is configured to retrieve the RF signal from the transmitter circuit to determine the transmitter I/Q mismatch of the transmitter circuit for the plurality of frequency bands; and
- the baseband circuit is configured to compensate for the transmitter I/Q mismatch of the transmitter circuit for the plurality of frequency bands to the baseband signal.

\* \* \* \* \*